United States Patent
Hou et al.

(10) Patent No.: US 10,462,824 B2
(45) Date of Patent: Oct. 29, 2019

(54) WIRELESS COMMUNICATION SYSTEM, AND BASE STATION SIDE AND USER EQUIPMENT SIDE DEVICE AND METHOD

(71) Applicant: Sony Corporation, Tokyo (JP)

(72) Inventors: Yanzhao Hou, Beijing (CN); Yuxin Wei, Beijing (CN); Qimei Cui, Beijing (CN); Qinyan Jiang, Beijing (CN); Shiyu Zhang, Beijing (CN); Hui Liang, Beijing (CN); Shiwei Cao, Beijing (CN); Xin Guo, Beijing (CN); Chen Sun, Beijing (CN); Jinhui Chen, Beijing (CN)

(73) Assignee: SONY CORPORATION, Tokyo (JP)

( * ) Notice: Subject to any disclaimer, the term of this patent is extended or adjusted under 35 U.S.C. 154(b) by 23 days.

(21) Appl. No.: 15/736,206

(22) PCT Filed: Jul. 27, 2016

(86) PCT No.: PCT/CN2016/091909
§ 371 (c)(1),
(2) Date: Dec. 13, 2017

(87) PCT Pub. No.: WO2017/016484
PCT Pub. Date: Feb. 2, 2017

(65) Prior Publication Data
US 2018/0184460 A1    Jun. 28, 2018

(30) Foreign Application Priority Data

Jul. 29, 2015  (CN) .......................... 2015 1 0456596

(51) Int. Cl.
*H04W 74/08* (2009.01)
*H04W 72/14* (2009.01)

(52) U.S. Cl.
CPC ....... *H04W 74/0833* (2013.01); *H04W 72/14* (2013.01); *H04W 74/08* (2013.01); *H04W 74/085* (2013.01)

(58) Field of Classification Search
CPC .................. H04W 74/0816; H04W 74/085
See application file for complete search history.

(56) References Cited

U.S. PATENT DOCUMENTS

| | | | |
|---|---|---|---|
| 2009/0285180 A1* | 11/2009 | Zhang ................. | H04W 74/004 370/331 |
| 2010/0169733 A1* | 7/2010 | Kim ...................... | H04L 1/1671 714/748 |

(Continued)

FOREIGN PATENT DOCUMENTS

| | | |
|---|---|---|
| CN | 101155405 A | 4/2008 |
| CN | 101188852 A | 5/2008 |

(Continued)

OTHER PUBLICATIONS

International Search Report dated Oct. 17, 2017 in PCT/CN2016/091909 filed Jul. 27, 2016.

(Continued)

*Primary Examiner* — Brian D Nguyen
*Assistant Examiner* — Deepa Belur
(74) *Attorney, Agent, or Firm* — Xsensus, LLP

(57) ABSTRACT

A base station side and user equipment side device and method in a wireless communication system, and a wireless communication system. The base station side device includes a processor configured to: respond to a random access request of the user equipment and determine that an access process initiated by the user equipment is a contention-based or a non-contention-based access process; and with respect to the contention-based access process, to prepare auxiliary access information for potential user equipment that has failed to access so that the user equip- (Continued)

ment that has failed to access and the base station can complete the access process based on interaction of auxiliary access information.

20 Claims, 11 Drawing Sheets

(56) References Cited

U.S. PATENT DOCUMENTS

| | | | | |
|---|---|---|---|---|
| 2010/0254333 A1* | 10/2010 | Shin | | H04W 74/02 |
| | | | | 370/329 |
| 2011/0249641 A1 | 10/2011 | Kwon et al. | | |
| 2013/0265866 A1* | 10/2013 | Yi | | H04W 74/0841 |
| | | | | 370/216 |
| 2015/0009813 A1* | 1/2015 | Nguyen | | H04W 74/002 |
| | | | | 370/230 |
| 2015/0057011 A1* | 2/2015 | Di Girolamo | | H04W 74/0808 |
| | | | | 455/454 |
| 2015/0173074 A1* | 6/2015 | Zhao | | H04W 74/085 |
| | | | | 370/336 |
| 2016/0205681 A1* | 7/2016 | Kim | | H04B 7/2656 |
| | | | | 370/329 |
| 2016/0309520 A1* | 10/2016 | Murakami | | H04W 74/0841 |
| 2018/0077645 A1* | 3/2018 | Yan | | H04W 74/0833 |
| 2018/0220466 A1* | 8/2018 | Park | | H04W 74/0833 |

FOREIGN PATENT DOCUMENTS

| | | |
|---|---|---|
| WO | 2011/100596 A2 | 8/2011 |
| WO | WO2013086874 A1 * | 6/2013 |

OTHER PUBLICATIONS

Extended European Search Report dated Jan. 31, 2019 in application No. 16829849.5, 9 pages.
China Mobile, ZTE, "Backoff for EUs of different priorities", 3GPP TSG-RAN WG2#61; R2-080750, Feb. 11-15, 2008, 3 pages.

* cited by examiner

| Logical root sequence number | Physical root sequence number u |
|---|---|
| 0-23 | 129, 710, 140, 699, 120, 719, 210, 629, 168, 671, 84, 755, 105, 734, 93, 746, 70, 769, 60, 779, 2, 837, 1, 838 |
| 24-29 | 56, 783, 112, 727, 148, 691 |
| 30-35 | 80, 759, 42, 797, 40, 799 |
| 36-41 | 35, 804, 73, 766, 146, 693 |
| 42-51 | 31, 808, 28, 811, 30, 809, 27, 812, 29, 810 |
| 52-63 | 24, 815, 48, 791, 68, 771, 74, 765, 178, 661, 136, 703 |
| 64-75 | 86, 753, 78, 761, 43, 796, 39, 800, 20, 819, 21, 818 |
| 76-89 | 95, 744, 202, 637, 190, 649, 181, 658, 137, 702, 125, 714, 151, 688 |
| 90-115 | 217, 622, 128, 711, 142, 697, 122, 717, 203, 636, 118, 721, 110, 729, 89, 750, 103, 736, 61, 778, 55, 784, 15, 824, 14, 825 |
| 116-135 | 12, 827, 23, 816, 34, 805, 37, 802, 46, 793, 207, 632, 179, 660, 145, 694, 130, 709, 223, 616 |
| 136-167 | 228, 611, 227, 612, 132, 707, 133, 706, 143, 696, 135, 704, 161, 678, 201, 638, 173, 666, 106, 733, 83, 756, 91, 748, 66, 773, 53, 786, 10, 829, 9, 830 |

Figure 5

| Dedicated PRACH configuration index | Preamble format | System frame number | Sub-frame number |
|---|---|---|---|
| 0 | 0 | Arbitrary | 0,1,2,3,4,5,6,7,8,9 |
| 1 | 0 | Arbitrary | 0, 2, 4, 6, 8 |
| 2 | 0 | Arbitrary | 1, 3, 5, 7, 9 |
| 3 | 1 | Arbitrary | 0, 2, 4, 6, 8 |
| 4 | 1 | Arbitrary | 1, 3, 5, 7, 9 |
| 5 | 2 | Arbitrary | 0, 2, 4, 6, 8 |
| 6 | 2 | Arbitrary | 1, 3, 5, 7, 9 |
| 7 | 3 | Arbitrary | 1, 4, 7 |
| 8 | 3 | Arbitrary | 2, 5, 8 |
| 9 | 3 | Arbitrary | 3, 6, 9 |

Figure 6

WIRELESS COMMUNICATION SYSTEM, AND BASE STATION SIDE AND USER EQUIPMENT SIDE DEVICE AND METHOD

The present application claims priority to Chinese Patent Application No. 201510456596.0, entitled "WIRELESS COMMUNICATION SYSTEM, DEVICE AND METHOD ON BASE STATION SIDE AND USER EQUIPMENT SIDE", filed on Jul. 29, 2015 with the State Intellectual Property Office of People's Republic of China, which is incorporated herein by reference in its entirety.

FIELD OF THE INVENTION

The embodiments of the present disclosure generally relate to the technical field of wireless communications, in particular to a random access procedure, and more particularly to apparatus, methods on a base station side and on a user equipment side in a wireless communication system, as well as a wireless communication system for accelerating the random access using auxiliary access information.

BACKGROUND OF THE INVENTION

With the increase in demands of users for high-speed data transmission, LTE is undoubtedly one of the most competitive wireless transmission technologies. In LTE, a user equipment may be in two states, that is, an RRC_CONNECTED state and an RRC_IDLE state. In a case where uplink synchronization is performed during the switch process (or performed for a user equipment losing uplink synchronization), or in a case where there is no sufficient resources for transmitting a scheduling request, a random access procedure is to be performed in order to cause the user equipment to transit from the RRC_IDLE state to the RRC_CONNECTED state or to recover from a link failure.

However, a maximum time interval currently required for a user equipment to transit from the RRC_IDLE state to the RRC_CONNECTED state is 50 ms. In addition, there may be a conflict in the random access procedure, which prolongs the random access procedure. Therefore, for some special services such as a V2X security service with a high real-time requirement and a service on unlicensed resources in which the resource availability changes rapidly, a time delay due to random access failure may result in a serious consequence. In order to meet the requirement in an application scenario with a high real-time requirement and to improve the communication efficiency, the random access procedure is desired to be accelerated.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

According to an aspect of the present disclosure, an apparatus on a base station side in a wireless communication system is provided. The apparatus includes a processing unit configured to: determine, in response to a random access request from a user equipment, whether an access procedure initiated by the user equipment is a contention-based access procedure or a non-contention-based access procedure; and prepare, for the contention-based access procedure, auxiliary access information for a user equipment potentially failing to access, to enable the user equipment failing to access to interact with the base station based on the auxiliary access information to complete the access procedure.

According to another aspect of the present disclosure, an apparatus on a user equipment side in a wireless communication system is provided. The apparatus includes a processing unit configured to: generate, based on predetermined configuration information, a random access request to initiate a contention-based access procedure; and in a case of failing to access, interact with a base station based on auxiliary access information from the base station, to complete the access procedure.

According to an aspect of the present disclosure, a method on a base station side in a wireless communication system is provided. The method includes: determining, in response to a random access request from a user equipment, whether an access procedure initiated by the user equipment is a contention-based access procedure or a non-contention-based access procedure; and preparing, for the contention-based access procedure, auxiliary access information for a user equipment potentially failing to access, to enable the user equipment failing to access to interact with the base station based on the auxiliary access information to complete the access procedure.

According to another aspect of the present disclosure, a method on a user equipment side in a wireless communication system is provided. The method includes: generating, based on predetermined configuration information, a random access request to initiate a contention-based access procedure; and in a case of failing to access, interacting with a base station based on auxiliary access information from the base station, to complete the access procedure.

According to another aspect of the present disclosure, a wireless communication system is provided, which includes a base station and a user equipment. The base station includes the above-described apparatus on the base station side in the wireless communication system, and the user equipment includes the above-described apparatus on the user equipment side in the wireless communication system.

According to other aspects of the present disclosure, computer program codes and computer program products for implementing the above-described method on the base station side and the above-described method on the user equipment side in the wireless communication system, and a computer readable storage medium on which the computer program codes for implementing the above-described method on the base station side and the above-described method on the user equipment side in the wireless communication system are recorded are also provided.

In the embodiments of the present disclosure, by preparing the auxiliary access information for the user equipment potentially failing to access in a contention-based random access procedure, to enable the user equipment to complete the access using the auxiliary access information, the random access procedure of the user equipment is accelerated.

These and other advantages of the present disclosure will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings:

FIG. 5 shows a table of logical root sequence numbers and physical root sequence numbers;

FIG. 6 is a diagram showing an example of a dense configuration of a dedicated PRACH resource configuration in a time domain;

DETAILED DESCRIPTION OF EMBODIMENTS

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

First Embodiment

Figure 1:
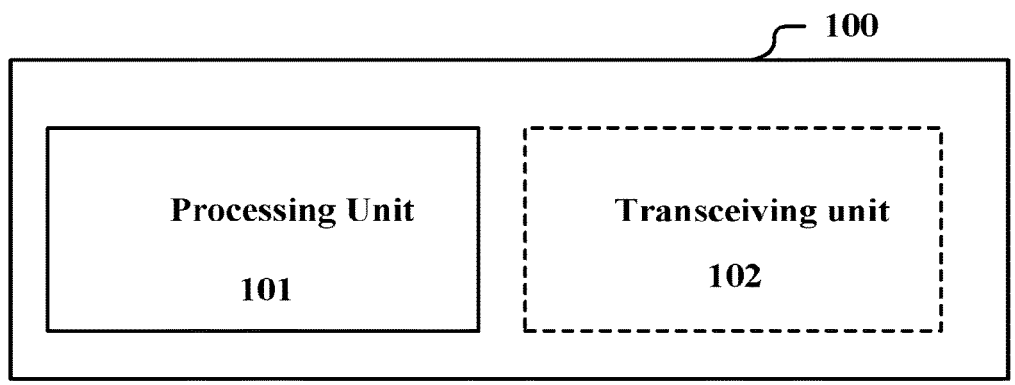
FIG. 1 is a block diagram showing a structure of an apparatus on a base station side in a wireless communication system according to an embodiment of the present disclosure.

FIG. 1 is a block diagram showing a structure of an apparatus 100 on a base station side in a wireless communication system according to an embodiment of the present disclosure. As shown in FIG. 1, the apparatus 100 includes a processing unit 101 configured to: determine, in response to a random access request from a user equipment (UE), whether an access procedure initiated by the UE is a contention-based access procedure or a non-contention-based access procedure; and prepare, for the contention-based access procedure, auxiliary access information for a UE potentially failing to access, to enable the UE failing to access to interact with the base station based on the auxiliary access information to complete the access procedure.

The processing unit 101 may be, for example, a central processing unit (CPU), a microprocessor, an integrated circuit module, or the like, which has data processing capability. It should be noted that the apparatus 100 may include one processing unit 101 or multiple processing units 101.

Further, the processing unit 101 may include various discrete functional units to perform various different functions and/or operations. It should be noted that the functional units may be physical entities or logical entities, and units having different names may be implemented by a same physical entity.

Figure 2:
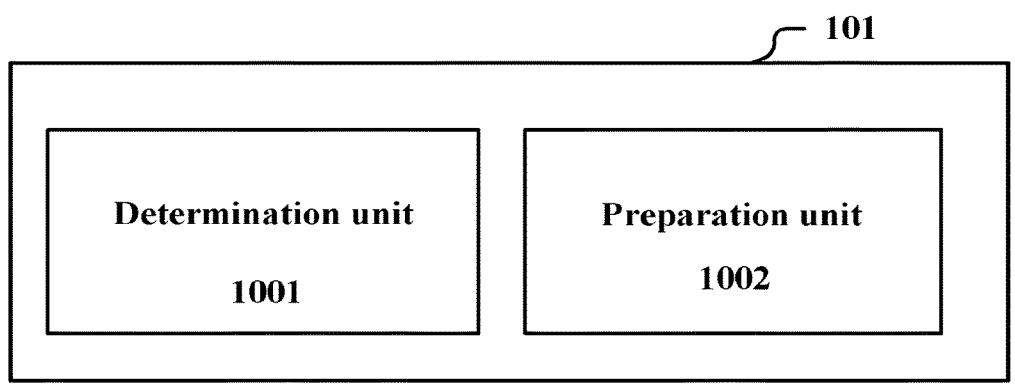
FIG. 2 is a block diagram showing an example of functional modules of the processing unit in FIG. 1.

For example, as shown in FIG. 2, the processing unit 101 may include: a determination unit 1001 configured to determine, in response to a random access request from a UE, whether an access procedure initiated by the UE is a contention-based access procedure or a non-contention-based access procedure; and a preparation unit 1002 configured to prepare, for the contention-based access procedure, auxiliary access information for a UE potentially failing to access, to enable the UE failing to access to interact with the base station based on the auxiliary access information to complete the access procedure. It should be understood that the structure of the functional modules shown in FIG. 2 is merely an example, and the present disclosure is not limited thereto.

The random access request from the UE may be a contention-based access request or a non-contention-based access request. For example, the contention-based access request and the non-contention-based access request use random access preamble sequences (which are also simply referred to as preamble sequences hereinafter) belonging to different groups. The processing unit 101 (specifically, for example, the determination unit 1001 in the processing unit 101) can determine, by determining a preamble sequence in a random access request belongs to which group, whether the access request is a contention-based access request or a non-contention-based access request. For example, the base station may broadcast in advance a set of preamble sequences for only the contention-based access, and the processing unit 101 determines whether the random access request is a contention-based random access request by comparing the preamble sequence in the random access request with the set. In addition, the base station may allocate the preamble sequence to the UE in advance through dedicated downlink signaling, where the allocated preamble sequence is reserved in advance to avoid conflicts, and the random access request transmitted by the UE using the allocated preamble sequence is a non-contention-based random access request.

In the contention-based random access procedure, there is a possibility that two or more UEs use the same random access preamble sequence and the same PRACH time-frequency resources to perform random access. In this case, two or more UEs transmit the same random access request, which cannot be identified by the base station. Therefore, the base station then transmits a same response, thereby resulting in a conflict between the two or more UEs, such that at least one LTE fails in the random access. In the conventional technology, the UE failing to access re-accesses after backing off for a period of time, which prolongs the random access procedure, that is, the UE is required to wait for a longer time to perform data transmission.

In order to accelerate the random access procedure, the processing unit in the present embodiment prepares the auxiliary access information for the UE failing to access, to enable the UE failing to access to interact with the base station based on the auxiliary access information to perform the access procedure. Since it is unnecessary to re-initiate an access, instead, the access is performed using the prepared auxiliary access information, even the UE failing to access can perform the access with a higher speed to perform data transmission, thus reducing the time delay. In addition, in a case where two or more UEs fail to access due to conflicts among the two or more UEs, the auxiliary access information may be repeatedly prepared when one of the UEs failing to access (a first failed UE) performs the access using the prepared auxiliary access information, to enable another UE failing to access (a second failed UE) to perform the access using the auxiliary access information. Further, if the second failed UE still cannot access successfully, the second failed UE re-initiates the access in the conventional manner. In addition, the probability for a UE to successfully perform random access is also improved.

The auxiliary access information is, for example, information that enables the UE to continue with the previous failed access procedure without re-transmitting a random access request. In an example, the auxiliary access information includes at least one of: reserved access identification information; a granted uplink resource indicator for the UE failing to access to perform a subsequent uplink transmission; and a reserved random access preamble sequence.

For example, generally, the base station allocates (or calculates) access identification information for a UE requesting to access for subsequent interaction. However, in the case of a conflict, only one UE can successfully complete the random access using the access identification information. The auxiliary access information includes the reserved access identification information so that the UE failing to access can perform a subsequent interaction using the reserved access identification information. For example, in the LTE system, the reserved access identification information may be a reserved temporary cell radio network temporary identity (RTC-RNTI). The UE failing to access scrambles uplink data using the RTC-RNTI, and then transmits the uplink data immediately. The base station monitors on the reserved uplink resources and descrambles the scrambled uplink data based on the corresponding RTC-RNTI, and thus the UE previously failing to access can access to the base station rapidly.

The above-described auxiliary access information may be contained in a response to a UE requesting to access. All the UEs requesting to access monitor a response from the base station so that the UE finally failing to access can acquire additional auxiliary access information in this random access procedure, which facilitates the next operation.

Correspondingly, the processing unit 101 (specifically, for example, the preparation unit 1002 in the processing unit 101) may be configured to generate a contention resolution message and/or a random access response (RAR) message containing the auxiliary access information. Specifically, all of the auxiliary access information may be contained in the contention resolution message, all of the auxiliary access information may be contained in the RAR, or a portion of the auxiliary access information may be contained in the contention resolution message and the rest is contained in the RAR. In the LTE system, the processing unit 101 may include the auxiliary access information in Msg. 2 and/or Msg. 4. For example, Msg. 4 further includes an ID of a UE finally succeeding in an access. On receiving the Msg. 4, the UE compares its ID with the ID included in the Msg. 4. If the ID of the UE is different from the ID included in the Msg. 4, it is determined that the UE fails to access, and then the UE continuously interact with the base station using the above auxiliary access information. In a case where the auxiliary access information is included in Msg. 4, it is unnecessary for the UE succeeding in an access to decode the auxiliary access information, thus the processing load of the UE is alleviated. In this process, the UE stores the received auxiliary access information in, for example, a buffer, reads the auxiliary access information and performs the subsequent access using the auxiliary access information in a case of failing to access, and clears this portion of buffer in a case of succeeding in access.

The apparatus 100 may operate as a base station, as shown in the dashed line block in FIG. 1, the apparatus 100 further includes a transceiving unit 102 configured to receive the random access request from the UE; transmit a random access response to the UE; receive uplink data based on the random access response; and transmit the contention resolution message.

Figure 3:
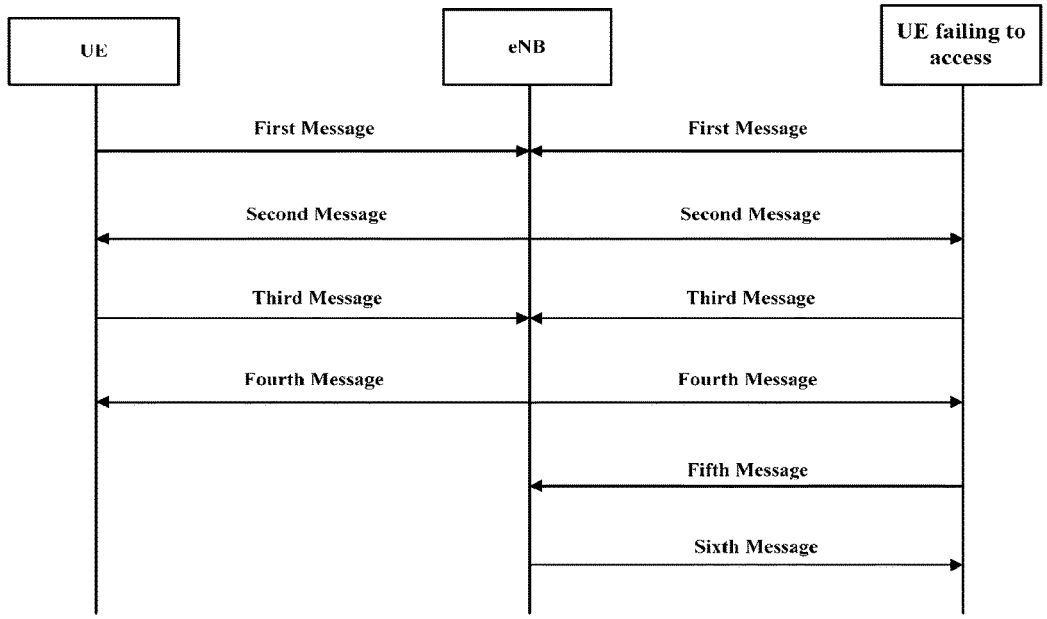
FIG. 3 is a diagram showing an example of an information procedure of a random access procedure according to an embodiment of the present disclosure.

FIG. 3 is a diagram showing an example of an information procedure of a random access procedure according to an embodiment of the present disclosure. Two UEs simultaneously transmit first messages, such as random access requests, to an eNB, using the same preamble sequence and the same PRACH time-frequency resources, in which case a random access conflict occurs. On receiving the random access requests, the transceiving unit 102 respectively transmits second messages, such as random access responses (RARs), to the two UEs. The RAR includes, for example, a time advance TA, TC-RNTI, and a granted uplink resource indicator for a third message. The UE transmits the third message based on the received RAR, where the third message may be an RRC connection request or some control messages or service packets, and includes identification information of the UE. Subsequently, the transceiving unit 102 transmits the fourth messages, such as contention resolution messages, to the UEs. As described above, the auxiliary access information for the UE failing to access may be included in the second message and/or the fourth message.

As an example, the above-described random access procedure is used to cause the UE to transit from the RRC_IDLE state to the RRC_CONNECTED state, in which case the third message is an RRC connection request, and the fourth message is an RRC connection establishment command in which the identification information of the UE succeeding in the access is included.

As shown in FIG. 3, the transceiving unit 102 may be further configured to monitor, after transmitting the contention resolution message, uplink data transmitted by the user equipment failing to access using the reserved access identification and the granted uplink resources, where the uplink data includes a unique identification of the user equipment failing to access. In FIG. 3, the uplink data is shown as a fifth message. Similar to the third message, the fifth message may be an RRC connection request, or may be some control messages or service packets, and includes a unique identification of the UE failing to access. For example, during an initial access of the UE, the fifth message may be an RRC connection establishment request, and includes a NAS UE identification; and in a case where the RRC connection is re-established, the fifth message may be an RRC connection re-establishment request, and includes the C-RNTI, where the NAS UE identification and the C-RNTI are the unique identifications of the UE.

In addition, the transceiving unit 102 may be further configured to transmit the RRC connection establishment command (shown as a sixth message in FIG. 3) using the unique identification of the user equipment failing to access, where the RRC connection establishment command contains a corrected time advance. Since the TA previously provided in the second message, for example, is not calculated for the UE failing to access, the TA is to be adjusted in a case where although the fifth message is received by the base station, positions of the two UEs and/or distances of the two UEs from the base station are significantly different from each other, so that subsequent data transmission can be performed correctly. TA can be calculated using any of the existing methods, which is not described here. The RRC connection establishment command includes the unique identification of the UE failing to access, to make sure that the second access of the UE failing to access can be performed successfully.

Figure 4:
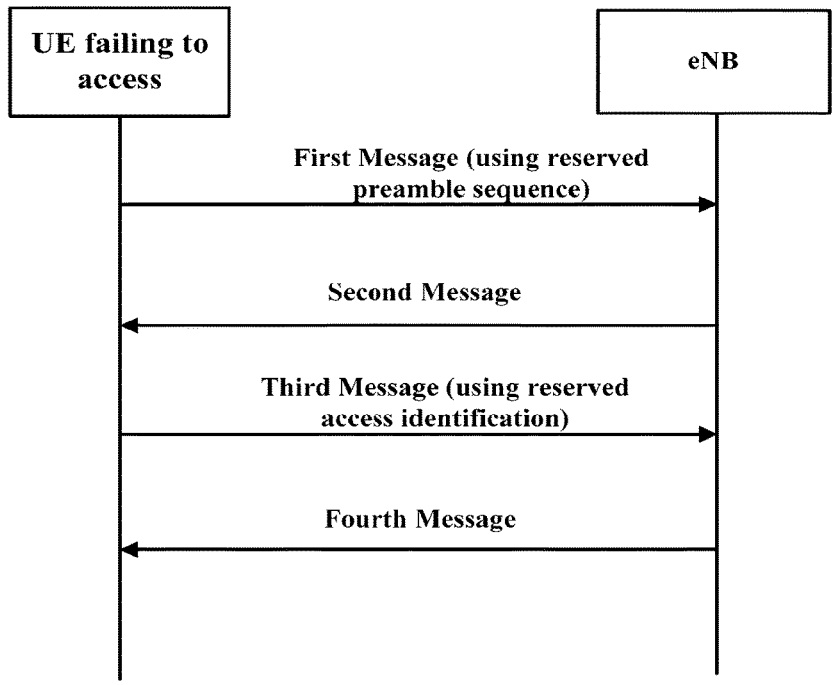
FIG. 4 is a diagram showing an example of an information procedure where a user equipment failing in the random access re-initiates an access using a reserved random access preamble sequence according to an embodiment of the present disclosure.

However, since the TA provided in the second message is not calculated for the UE failing to access, there may be a case where the base station cannot receive the fifth message transmitted by the UE failing to access based on the TA. In a further example of the present disclosure, in this case, the UE sets a timer T after transmitting the fifth message. If a sixth message is not received until the timer is expired, the UE transmits the random access request (that is, the first message) using the reserved random access preamble sequence in the fourth message. In other words, the UE failing to access re-initiates a random access using the reserved preamble sequence. The associated information procedure is as schematically shown in FIG. 4. On receiving the random access request, the transceiving unit 102 transmits the random access response (that is, the second message) including the TA calculated for the UE and an indicator of a newly granted uplink resources for subsequent uplink transmission, and then receives uplink data (that is, the third message), such as the RRC connection request, transmitted by the UE failing to access based on the re-calculated TA using the reserved access identification information and the above-described newly granted uplink resources. Subsequently, the eNB transmits the fourth message such as the RRC connection establishment command. Since the preamble sequence used in the random access procedure is reserved, there is no conflict with other UEs, and the random access procedure is essentially a non-contention-based access procedure.

The above-described base station may be implemented as an eNB in an LTE communication system or may be a base station of another type. In an example, the UE requests to access to a cell operating on an unlicensed frequency band. Unlicensed transmission resources are, for example, transmission resources that are not allocated to the cellular system in regulations in various countries, such as transmission resources allocated to communication systems other than the cellular system, such as 2.4 GHz or 5 GHz operation frequency band on which the WiFi system operates, or a transmission frequency band on which the television broadcast system operates. Applications of unlicensed transmission resources in LTE systems are discussed in the current 3GPP standards. A conventional practice is to detect whether the unlicensed frequency band is idle before using the corresponding frequency band. In a case where the unlicensed frequency band is determined to be idle, the unlicensed frequency band is used under a restriction of a certain occupation time period. In other words, in order to ensure fair use, the use of the unlicensed frequency band is generally time-limited. Therefore, a rapid access indicates a more efficient use of the frequency band. In this example, the above-described apparatus 100 according to the present disclosure can effectively accelerate the random access procedure, thereby improving the efficiency in using the unlicensed frequency band.

As described above, the apparatus 100 according to the embodiment provides the auxiliary access information for the UE failing to access, such that the UE failing to access can perform the access based on the auxiliary access information using the reserved information/resources without re-initiating an access request, thereby accelerating the random access procedure of the UE failing to access, and reducing the time delay.

Second Embodiment

In the first embodiment, the auxiliary access information is prepared for all UEs, that is, all the UEs can accelerate the access processes based on the auxiliary access information in the case of conflict occurring. However, the auxiliary access information may be prepared for only a part of the UEs, that is, random access procedures of only a part of the UEs are accelerated.

For example, the wireless communication system includes a high-priority level UE and a low-priority level UE. The processing unit 101 is configured to prepare, in a case of determining that the UE issuing the random access request is the high-priority level UE, the auxiliary access information for the UE failing to access. Referring to the block diagram of the functional blocks shown in FIG. 2, for example, the determination unit 1001 determines whether the UE issuing the random access request is the high-priority level UE, and in the case where the UE issuing the random access request is the high-priority level UE, the preparation unit 1002 prepares the auxiliary access information for the UE failing to access. In other words, the auxiliary access information is prepared only when a conflict occurs between the high-priority level UEs, to accelerate the random access procedures of the high-priority level UEs. Of course, it may also be configured that the auxiliary access information is prepared for all the UEs, but the UE determines its own service type on receiving the auxiliary access information and use the auxiliary access information to access only in the case where the UE itself is the high-priority level UE.

In an example, the processing unit 101 is further configured to: set a first predetermined back-off period for the low-priority level UE, to cause the low-priority level UE to re-transmit the random access request after backing off for the first predetermined back-off period in a case of failing to access; and/or set a second predetermined back-off period for the high-priority level UE, to cause the high-priority level UE to re-transmit the random access request after backing off for the second predetermined back-off period in a case of failing to access, where the first predetermined back-off period is longer than the second predetermined back-off period. Referring to the block diagram of the functional blocks shown in FIG. 2, for example, the above-described first predetermined back-off period and the second predetermined back-off period are set by the preparation unit 1002.

In the conventional technology, a value between 0 to BI (back-off indicator) value is randomly selected as the back-off period after the UE fails to access, where a value of the BI is set based on a cell load. In this embodiment, for example, the values for the high-priority level UE and the low-priority level UE may be randomly selected from different ranges. For example, for the high-priority level UE, the value is selected from 0 to BI1, and for the low-priority level UE, the value is selected from 0 to BI2, where BI1<BI2. In addition, for the low-priority level UE, the value may also be selected from, for example, BI1 to BI2. Of course, a shorter back-off period may be set for only the high-priority level UE, and an existing setting is used for the low-priority level UE.

By setting a shorter back-off period for the high-priority level user, the speed and success rate of the access by the high-priority level UE can be improved and the real-time performance of the data transmission of the high-priority level UE can be improved. It should be understood that the scenario to which the example may be applied is not limited to the access based on the auxiliary access information described above; instead, the example may be applied to the random access of any UE provided with a priority level.

In an example, the processing unit 101 (specifically, for example, the determination unit 1001 in the processing unit 101) is configured to determine whether the UE performing the random access is the high-priority level UE based on at least one of: the random access preamble sequence in the random access request, an information bit in the random access request for indicating whether the UE is the high-priority level UE, and time-frequency resources where the random access preamble sequence is located.

For example, different random access preamble sequences may be allocated for the high-priority level UE and the low-priority level UE so that the processing unit 101 may determine whether the random access request is from the high-priority level UE or the low-priority level UE based on the preamble sequence in the random access request.

Specifically, in a case of determining that the random access preamble sequence in the random access request belongs to a specific group, the processing unit 101 determines that the corresponding UE is the high-priority level UE. In this case, a new preamble sequence group for the high-priority level UE may be defined in advance.

Group A and group B are defined in the current standard. In a case where a new preamble sequence group is to be defined, information regarding the new preamble sequence group is to be added in the RACH configuration, which, for example, is included in SIB2. As an example, the configuration information of the new preamble sequence group may be included in an RACH-ConfigCommon information element when the RACH-ConfigCommon information element is generated by the base station. For example, information of preamble sequences and transmission powers included in the new preamble sequence group may be enumerated. In a practical application, the base station may include RACH configuration information such as the RACH-ConfigCommon information element in a system information message such as SIB2 and transmit the system information message to the UE by broadcast signaling or dedicated signaling for use by the UE in a random access. Accordingly, the UE acquires information of a range from which the preamble sequence available to the UE serving as the high-priority level UE when performing the random access may be selected, and the like by parsing the RACH configuration information in the system information message.

In addition, the base station may cause the high-priority level UE and the low-priority level UE to use different root sequence values, so that different ranges of preamble sequences used by the high-priority level UE and the low-priority level UE can be determined. For example, a portion of the physical root sequence numbers u shown in FIG. 5 is selected for the high-priority level UE and the rest is used for the low-priority level UE. Specifically, serial numbers for the high-priority level UE and the low-priority level UE may be identified in the system information, respectively. The UE can select a corresponding sequence number based on its priority level to generate the preamble sequence. The processing unit 101 can determine the priority level of the UE based on the preamble sequence.

Alternatively, the base station causes the high-priority level UE and the low-priority level UE to use the same root sequence, but use different cyclic shifts so that the high-priority level UE and the low-priority level UE can be distinguished. For example, the base station may inform the UE of the values of the cyclic shifts for the high-priority level UE and the low-priority level UE through system information or high-layer signaling.

As described above, the base station may not distinguish between the preamble sequences used by the UEs of different priority levels. Instead, the UEs of different priority levels are distinguished in the process of transmitting the preamble sequences.

In an example, an information bit, for example, an identification of one bit, for indicating whether the UE is the high-priority level UE can be transmitted along with the preamble sequence. This information can occupy an existing guard interval and then be mapped to PRACH for transmission.

In addition, the processing unit 101 may also be configured to calculate a random access radio network temporary identity (RA-RNTI) of the UE based on the time-frequency resources where the random access preamble sequence is located, and determine whether the UE is the high-priority level UE based on the RA-RNTI. In this case, for example, dedicated PRACH resources are allocated for the high-priority level UE, which is equivalent to a case where the high-priority level UE has a specific RA-RNTI, since the RA-RNTI corresponds to the PRACH resources. Based on this, the processing unit 101 can determine whether the UE is the high-priority level UE. The dedicated PRACH resource can also be allocated by a high-layer signaling configuration prach-configurationIndex.

Since too few PRACH time domain resources result in an increase in waiting time of the UE for transmitting the preamble sequence, the dedicated PRACH resources are densely configured in the time domain. Since lengths in time domain occupied by the preamble signals of different preamble formats (0-3) are different, the densest configurations that can be used by the preamble signals of different preamble formats respectively are as shown in FIG. 6. Note that FIG. 6 shows the densest time domain configuration used for optimizing the time delay, but the densest time domain configuration is not limited thereto. In a practical application, other configurations may also be used in a case of considering factors such as overhead.

As described above, the auxiliary access information may be prepared for only the high-priority level UE. In other words, the information procedure based on the auxiliary access information shown in FIG. 3 is performed only in a case where the UE subjected to the conflict in FIG. 3 is the high-priority level UE.

In addition, in order to further accelerate the random access of the high-priority level UE, the transceiving unit 102 may be further configured to preferentially transmit the random access response to the high-priority level UE on receiving random access requests from multiple UEs including the low-priority level UE and the high-priority level UE (which are to be responded one by one with no conflict occurring).

As an example of the high-priority level UE, the above-described UE is a V2X user equipment. Proximity-based service (ProSe) direct communication involved in the 3GPP (the third Generation Partnership Project) standard refers to a mode where the UEs can directly communicate with each other (according to the LTE communication protocol and based on corresponding transmission resources). The ProSe direct communication may include, for example, communication performed between a vehicle and an associated entity (V2X communication), which may include, for example, vehicle-to-vehicle (V2V) communication, vehicle-to-infrastructure (V2I) communication, and vehicle-to-pedestrian (V2P) communication. Both communication parties (for example, vehicles) in the V2X communication are referred to as V2X user equipments.

Figure 7:
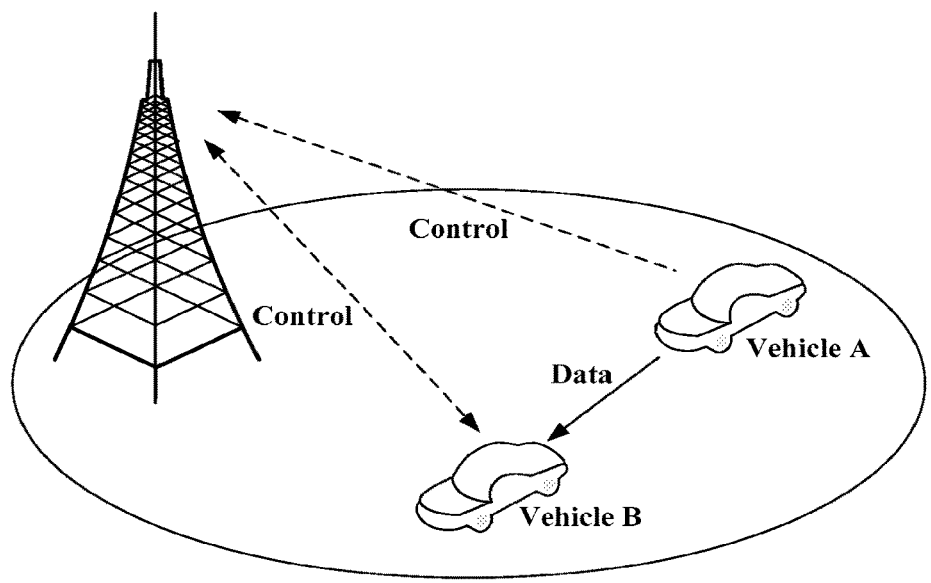
FIG. 7 shows an illustrative example of a V2V application scenario.

FIG. 7 shows an illustrative example of a V2V application scenario in which a vehicle A is to broadcast a security message to a vehicle, for example, a vehicle B, in its vicinity. The manner in which the vehicle A as a UE obtains resources for transmission mainly includes: 1) the base station allocates resources to the UE; and 2) the UE autonomously selects the resources in the resource pool. With the first manner, the UE needs to first enter into the RRC_CONNECTED state to request and acquire the resources allocated by the base station for the UE, so as to perform the data transmission. With the second manner, the UE is not required to enter into the RRC_CONNECTED state, but autonomously selects the resources to perform the data transmission. In view of a high requirement on time delay and reliability of a V2X security service, the first manner is preferred. The random access using the auxiliary access information according to the present disclosure can shorten the random access procedure and improve the probability of successful access, and thus can be effectively applied to the V2X security service.

In a case where the user equipment is a V2X user equipment, the uplink data in the third message and the fifth message may also include location information (a geographical location) of the user equipment.

The processing unit 101 (for example, the determination unit 1001 in the processing unit 101) may be configured to select a UE necessary to receive a security information broadcast based on location information of the UE in the RRC connection. The transceiving unit 102 may inform the selected UE of the resource position (the time-frequency resource position) of the security information broadcast through RRC signaling.

For example, referring to FIG. 7, the vehicle A initiates a random access request to the base station and successfully accesses to the base station or successfully accesses to the base station using the auxiliary access information, and simultaneously reports its own location information to the base station in the third message. The processing unit 101 determines, based on the location information, vehicles within a certain range around the vehicle A as UEs necessary to receive the security information broadcast provided by the vehicle A. Further, the transceiving unit 102 notifies the selected vehicles of the resource position of the security information broadcast provided by the vehicle A through RRC signaling. These vehicles can obtain the corresponding security information broadcast based on the resource position. In this way, the base station can acquire the position of the vehicle A (without subsequent interaction) in the random access procedure, thereby facilitating determination of the communication object of the vehicle A as soon as possible, and thus the establishment time delay of an actual V2V communication is reduced.

In addition, the base station may also notify the UE necessary to receive the security information broadcast by broadcasting the system information including the location information of the UE (for example, the vehicle A) that performs the security information broadcast and the resource position of the security information broadcasted by the UE. In this case, even the UE in the RRC_IDLE state can receive the information and calculate a distance between the broadcast UE and the UE itself based on the location information of the broadcast UE and its own location information, and determine whether it is necessary to receive the security information broadcast based on the distance, for example, determine it is necessary to receive the security information broadcast only when the distance is less than a certain threshold. Of course, the above-described two manners can be used in combination.

In an existing LTE system, the UE transmits a scheduling request (SR) to the base station after finishing the random access, and informs the base station whether there is a need for transmitting data through the SR. After the base station receives the SR, the amount of uplink resources allocated to the UE is determined based on the implementation of the base station. A common practice is to allocate at least enough resources for the UE to transmit a buffer status report (BSR). The UE then informs the base station, through the BSR, of amount of data to be transmitted. Eventually, the base station allocates sufficient uplink resources to the UE.

If this manner is adopted in the V2X security service, the resource request procedure before the security information broadcast may cause a significant time delay. Due to the particularity of the V2X service, the amount of data of the broadcasted security information is generally small and is relatively fixed. Therefore, in a case where the UE is a V2X user equipment, the RRC connection establishment command may further include uplink resource scheduling for the security information broadcast. In this way, the time delay of the V2X security information broadcast can be reduced.

Figure 8:
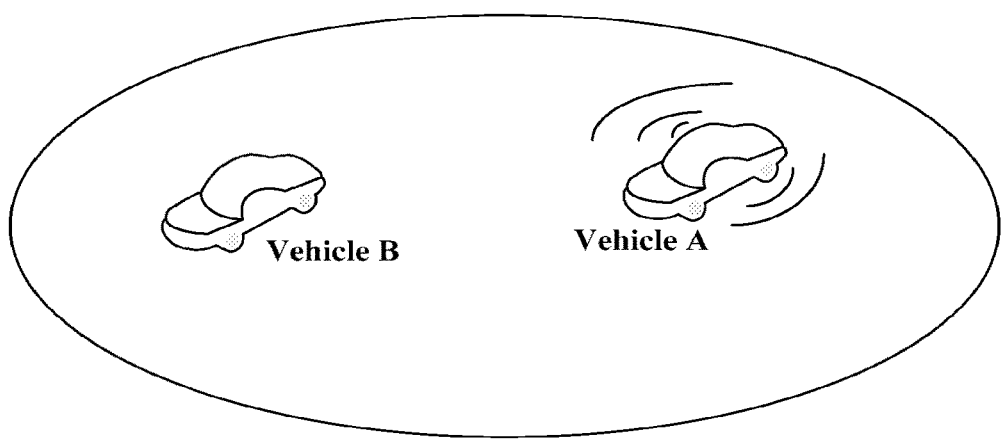
FIG. 8 is a schematic diagram showing a scenario in which a vehicle autonomously performs communication in a V2V application.

For the V2X security service, in a case where the vehicle is within network coverage, a resource acquisition manner of the above-mentioned first manner is generally used to ensure a communication reliability requirement of the vehicle. As an alternative manner, in a case where the vehicle is within the network coverage or outside of the network coverage range, a resource acquisition manner of the second manner can also be used. As shown in FIG. 8, the vehicle autonomously performs communication without a control of the base station. Since the equipment autonomously selects the resources from the resource pool for data transmission, the resource acquisition manner of the second manner is advantageous for reducing communication time delay. However, it is difficult to meet the reliability requirement of the security service.

Therefore, with the second manner, the communication reliability can be optimized as follows, in which the key is to reduce a resource collision probability of the security service.

The resource pool includes a common spectrum resource for a resource occupation broadcast, and an available resource set for data transmission, where the available resource set is divided into resource blocks which have a same size or different sizes and are numbered. In a case where the UE, such as the vehicle, needs to broadcast security information, the resource is acquired in the following procedure:

1) the UE selects a data transmission resource block from the resource pool based on a data transmission requirement of the UE;

2) the UE broadcasts its resource occupation informing information on the common spectrum resource, the resource occupation informing information includes at least the UE identification and the number of the resource block occupied by the UE;

3) all the UEs continuously monitor the resource occupation broadcast on the common spectrum resource. After another UE receives the resource occupation informing information broadcasted on the common spectrum resource, if the another UE is using the resource, or a resource occupation informing information for the resource from another UE is received within a certain period of time before the another UE receives the resource occupy informing information, or information transmitted on the resource from another UE is received, occupation deny information is broadcasted on the common spectrum resource, which includes at least the number of the occupied resource block;

4) the UE monitors whether there is occupation deny information from other UE on the common spectrum resource within a certain period of time after broadcasting the resource occupation informing information of the UE, re-selects a resource to repeat the above operation if there is the occupation deny information from the other UE, and otherwise uses the selected resource to perform the security information broadcast;

5) the other UE also monitors whether there is occupation deny information from other UE, avoids selecting the resource block notified in the occupation deny information within a certain period of time in a case where the other UE needs to broadcast security information if there is the occupation deny information from the other UE, and otherwise monitors the security information broadcast on the corresponding resource block.

In addition, within the coverage of the base station, the UE may also receive a system information broadcast from the base station. As a result, the base station can periodically update a resource pool configured for the security service. It should be understood that the communication reliability optimization manner described above with reference to FIG. 8 may be independent from the random access based on the auxiliary access information according to the present disclosure and may be independently applied to an appropriate occasion.

As another example of the high-priority level UE, the UE is a UE that requests access to a cell on an unlicensed frequency band. A random access response and/or a contention resolution message include at least one of information of a defined transmission time duration on an unlicensed frequency band and information of uplink resources designated for initial scheduling transmission. The uplink resources for the initial scheduling transmission are resources of a primary cell or resources of a cell on an unlicensed frequency band.

For example, in a case where the UE is an LAA (license assisted access) user, the third message is the initial scheduling transmission, and the information of the uplink resources designated for the initial scheduling transmission may be specified in the second message (that is, the random access response). The uplink resources may be resources of a primary cell or resources of a cell on an unlicensed frequency band, which depends on an indicator in the random access response. Alternatively/additionally, the contention resolution message may also include a definition on the transmission time duration on the unlicensed frequency band, thereby facilitating transmission of an uplink scheduling request by the UE.

In a case of accessing to an independent cell on an unlicensed frequency band, all the UEs may have the same priority level, and contention may also exist among the UEs. The above-described accelerated access based on the auxiliary access information is also applicable to this case.

Although the example of determining the high-priority level UE and the low-priority level UE and specific application scenarios thereof are described above, the present disclosure is not limited thereto. Other determining methods may be adopted, and the present disclosure may be applied to other suitable scenarios.

Third Embodiment

Figure 9:
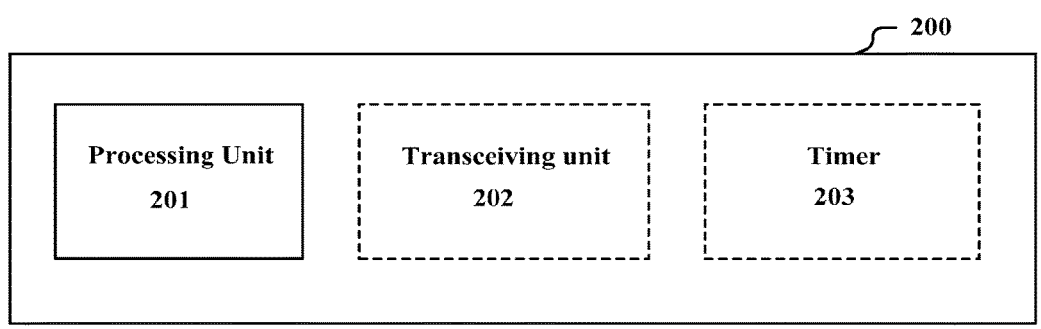
FIG. 9 is a block diagram showing a structure of an apparatus on a user equipment side in a wireless communication system according to an embodiment of the present disclosure.

FIG. 9 is a block diagram showing a structure of an apparatus 200 on a user equipment side for wireless communications according to an embodiment of the present disclosure. The apparatus 200 includes a processing unit 201 configured to: generate, based on predetermined configuration information, a random access request to initiate a contention-based access procedure; and in a case of failing to access, interact with a base station based on auxiliary access information from the base station, to complete the access procedure.

Similarly, the processing unit 201 may be, for example, a central processing unit (CPU), a microprocessor, an integrated circuit module, or the like which has data processing capability. It is to be noted that the apparatus 200 may include one processing unit 201 or multiple processing units 201.

Further, the processing unit 201 may include various discrete functional units to perform various different functions and/or operations. It should be noted that the functional units may be physical entities or logical entities, and units having different names may be implemented by a same physical entity.

Figure 10:
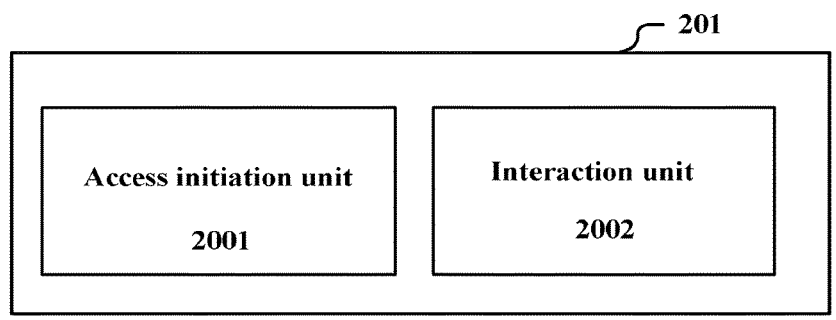
FIG. 10 is a block diagram showing an example of functional modules of the processing unit in FIG. 9.

For example, as shown in FIG. 10, the processing unit 201 includes: an access initiation unit 2001, configured to generate, based on predetermined configuration information, a random access request to initiate a contention-based access procedure; and an interaction unit 2002, configured to interact, in a case of failing to access, with a base station based on auxiliary access information from the base station, to perform the access procedure.

As described above, the processing unit 201 may generate the random access request based on an available random access preamble sequence and available PRACH resources, and continuously interact with the base station based on the received auxiliary access information in a case where the UE conflicts with another UE and the access is failed, so as to complete the access.

Similarly, the auxiliary access information may include at least one of: reserved access identification information; a granted uplink resource indicator for the user equipment failing to access to perform a subsequent uplink transmission; and a reserved random access preamble sequence.

In an example, the auxiliary access information is contained in a response to a user equipment finally succeeding in an access.

Taking establishment of an RRC connection in the LTE system as an example, the UE transmits the random access request to an eNB, which transmits the random access response in response to the random access request. The random access response includes TA, TC-RNTI allocated to the UE, and a granted uplink resource indicator for Msg. 3. The UE transmits Msg.3 based on the random access response, where Msg.3 includes a unique identification of the UE. The eNB transmits Msg.4 on receiving Msg.3, where Msg.4 includes an identification of the UE succeeding in contention. In a case where two or more UEs conflict with each other due to using the same preamble sequence and the same PRACH time-frequency resources for access, the eNB may include the auxiliary access information in the contention resolution message and/or the random access response message for use by a UE potentially failing to access. Accordingly, the processing unit 201 (specifically, for example, the interaction unit 2002 in the processing unit 201) may be configured to parse the random access response message and/or a contention resolution message for the random access request to determine the auxiliary access information.

In addition, as shown in the dashed line block in FIG. 9, the device 200 further includes a transceiving unit 202 configured to: transmit the random access request to the base station; receive a random access response from the base station; transmit uplink data to the base station based on the random access response; and receive a contention resolution message. Note that the information procedure in FIG. 3 is still applicable here, except that the device 200 is located in the UE. For the sake of brevity, the relevant details in the first embodiment and the second embodiment are not repeated in this embodiment.

In a case where the processing unit 201 determines that the UE fails to access based on the contention resolution message, the transceiving unit 202 is further configured to transmit uplink data to the base station using the reserved access identification and granted uplink resources. The uplink data contains a unique identification of the user equipment.

In a case where the base station successfully receives the uplink data (that is, the fifth message in FIG. 3), the base station transmits a sixth message including the unique identification of the UE, such as an RRC establishment command, to the UE. However, as described above, since the TA used for transmitting the uplink data is calculated for a previous UE that succeeded in an access rather than the current UE, the base station may not receive the transmitted uplink data, and do not feed the sixth message back accordingly.

Therefore, as shown in the dashed line block in FIG. 9, the apparatus 200 may further include a timer 203 configured to start timing when the transceiving unit 202 transmits uplink data to the base station using the reserved access identification and the granted uplink resources, and stop timing when the transceiving unit 202 receives a corresponding RRC connection establishment command. The RRC connection establishment command includes a corrected TA which is for the UE failing to access and may be used in subsequent data transmission. In a case where a timing duration of the timer exceeds a predetermined value and the transceiving unit 202 does not receive the corresponding RRC connection establishment command, the transceiving unit 202 is further configured to: transmit the random access request to the base station using the reserved random access preamble sequence; receive a random access response from the base station, where the random access response includes a re-calculated time advance and a granted uplink resource indicator for subsequent uplink transmission; and transmit an RRC connection establishment request to the base station using the reserved access identification and granted uplink resources based on the re-calculated time advance. In other words, in a case where the timer expires, the UE re-initiates an access using the reserved random access preamble sequence, and the access does not conflict with accesses of the other UEs due to the reservation of the resource. Therefore, the access is a non-contention-based access procedure.

In a case where the wireless communication system includes the high-priority level UE and the low-priority level UE, it may be configured that only the high-priority level UE performs the random access based on the auxiliary access information. The configuration may be performed by the base station, that is, the base station determines whether the UE subjected to a conflict is the high-priority level UE. Alternatively, the configuration may be performed by the UE itself, that is, the UE interacts with the base station using the received auxiliary access information only in a case where the UE is the high-priority level UE. Otherwise, the UE re-starts a random access procedure as in the conventional technology.

In an example, the processing unit 201 (specifically, for example, the access initiation unit 2001 in the processing unit 201) is configured to determine, based on a type of the user equipment and/or a type of an application of the user equipment, whether the user equipment is the high-priority level user equipment. For example, whether the user equipment is the high-priority level user equipment may be determined based on a payment condition of the UE, or a UE executing an application having a high real-time requirement is determined as the high-priority level UE.

In order to facilitate distinguishing between the high-priority level UE and the low-priority level UE by the base station, the UE may be configured, for example, in at least one aspect such as the preamble sequence, the time-frequency resources, and transmission of the random access request.

As an example, the processing unit 201 (for example, the access initiation unit 2001) may be configured to determine different random access preamble sequences for user equipments of different priority levels. A correspondence between the preamble sequence and the priority level of the UE is known to the base station so that the base station can determine whether the UE is the high-priority level UE based on the preamble sequence in the random access request. For example, the processing unit 201 may be configured to allocate different root sequence values to user equipments of different priority levels. The processing unit 201 may further be configured to configure different cyclic shifts for user equipments of different priority levels. Information on a configuration of the cyclic shift may be contained in the system information or high-layer signaling. One can refer to the description in the second embodiment for the detailed description, which is not repeated here.

As another example, the processing unit 201 may be configured to determine, for user equipments of different priority levels, different time-frequency resources for random access requests. The base station can determine whether the UE is the high-priority level UE since different time-frequency resources correspond to different RA-RNTIs.

In addition, the random access request may include an information bit indicating whether the user equipment is the high-priority level user equipment. The base station learns whether the UE is the high-priority level UE by reading the information bit.

In another example, in order to further accelerate the random access of the high-priority level UE, the following configuration may be performed. In a case where the processing unit 201 (for example, the access initiation unit 2001) determines that the UE is a low-priority level UE and the UE fails in the random access, the transceiving unit 202 is configured to re-transmit the random access request after backing off for a first predetermined back-off period set by the base station; and/or in a case where the UE is the high-priority level UE and the UE fails in the random access, the transceiving unit 202 is configured to re-transmit the random access request after backing off for a second predetermined back-off period set by the base station, where the first predetermined back-off period is longer than the second predetermined back-off period.

As an example of the high-priority level UE, the UE is a V2X user equipment, where the V2X security service has a high requirement on the real-time performance and the communication reliability.

In this example, the transceiving unit 202 transmits the random access request in a case where at least one of the following conditions is satisfied: a time duration where the user equipment is in the RRC_IDLE state exceeds a predetermined threshold; the user equipment arrives at a specific area (such as an accident prone area); and it is necessary to broadcast information. This is because in a case where the UE such as a vehicle necessary to broadcast security information is in the RRC_IDLE state, the random access procedure may cause a great time delay. The possibility that the UE is in the RRC_IDLE state when the UE is necessary to broadcast the security information can be reduced by setting the above conditions.

As described above, the uplink data may also include location information of the user equipment so that the base station can conveniently acquire the location information of the UE, and select UE that is necessary to receive the security information broadcast based on the location information or broadcast the location information.

In an example, the transceiving unit 202 is further configured to receive broadcast system information from a base station. The broadcast system information includes position information of a V2X user equipment performing a broadcast and a resource position of a corresponding security information broadcast. In addition, the processing unit 201 (which may be implemented by, for example although not shown in the figure, another configuration such as a determination unit) can determine whether it is necessary to receive the security information broadcast based on the location information of the UE and the location information of the V2X user equipment performing the broadcast. In a case where the UE where the apparatus 200 is located is necessary to receive the security information broadcast, the UE can acquire relevant information in this manner to receive the security information broadcast, even when the UE in which the apparatus 200 is located is in the RRC_IDLE state.

Alternatively/in addition, the transceiving unit 202 may be configured to receive RRC signaling from the base station. The RRC signaling includes a resource position of the security information broadcast necessary to be received by the user equipment, and the transceiving unit 202 is configured to receive the security information broadcast at the resource position. In this manner, the base station selects the UE necessary to receive the security information broadcast and transmits the RRC signaling.

In addition, since the data amount of the security information to be broadcasted in the V2X application is small and relatively fixed, the RRC connection establishment command may also include uplink resource scheduling for the security information broadcast. In this way, the time delay of the security information broadcast can be further reduced.

In addition, the UE may request access to a cell operating on an unlicensed frequency band. In this case, UEs may not be prioritized. However, since there is contention among the UEs as well, the above-described technique of accelerating the access based on the auxiliary access information may be applied. Since the unlicensed frequency band is used quite randomly and dynamically, the acceleration of the random access procedure is very beneficial for improving the usage efficiency of the unlicensed frequency band. In addition, the random access response and/or the contention resolution message may include at least one of information of the defined transmission time duration on the unlicensed frequency band and information specifying uplink resources for an initial scheduling transmission. The transmission of relevant information is additionally performed in the random access procedure, such that the base station can effectively perform scheduling based on the information, thereby improving the transmission efficiency.

When applied to the LAA, the UE that requests access to a cell on an unlicensed frequency band may be the high-priority level UE. Similarly, the random access response and/or the contention resolution message includes at least one of information of the defined transmission time duration on the unlicensed frequency band and information specifying uplink resources for the initial scheduling transmission. The uplink resources for the initial scheduling transmission are resources of a primary cell or resources of a cell on an unlicensed frequency band.

The apparatus 200 according to the this embodiment enables the UE to continuously interact with the base station using the auxiliary access information in a case where the access is failed so as to complete the access procedure, and thus the random access is accelerated and the time delay is reduced.

Fourth Embodiment

In the process of describing the apparatus for base station side and user equipment side in a wireless communication system in the embodiments described above, obviously, some processing and methods are also disclosed. Hereinafter, an overview of the methods is given without repeating some details disclosed above. However, it should be noted that, although the methods are disclosed in a process of describing the apparatus for base station side and user equipment side in a wireless communication system, the methods do not certainly employ or are not certainly executed by the aforementioned components. For example, the embodiments of the apparatus for base station side and user equipment side in a wireless communication system may be partially or completely implemented with hardware and/or firmware, the method described below may be executed by a computer-executable program completely, although the hardware and/or firmware of the apparatus for base station side and user equipment side in a wireless communication system can also be used in the methods.

Figure 11:
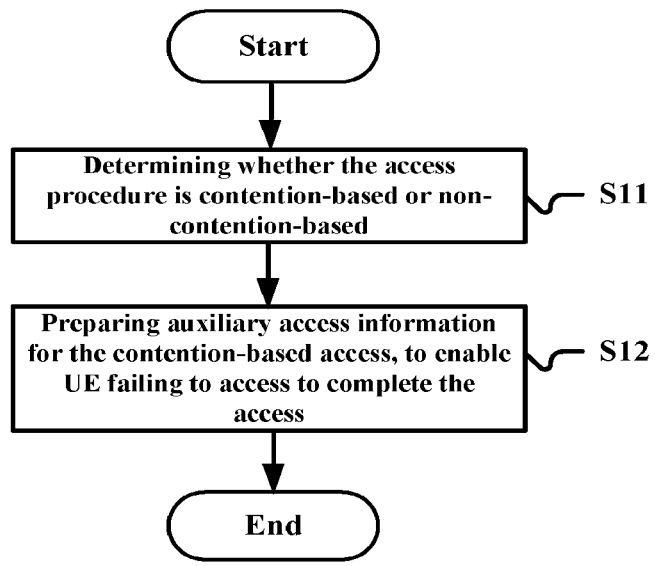
FIG. 11 is a flow chart showing a method on a base station side in a wireless communication system according to an embodiment of the present disclosure.

FIG. 11 is a flow chart showing a method on a base station side in a wireless communication system according to an embodiment of the present disclosure. As shown in FIG. 11, the method includes: determining, in response to a random access request from a user equipment, whether an access procedure initiated by the user equipment is a contention-based access procedure or a non-contention-based access procedure (S11); and preparing, for the contention-based access procedure, auxiliary access information for a user equipment potentially failing to access, to cause the user equipment failing to access to interact with the base station based on the auxiliary access information to complete the access procedure (S12).

The auxiliary access information may include at least one of: reserved access identification information; a granted uplink resource indicator for a user equipment failing to access to perform a subsequent uplink transmission; and a reserved random access preamble sequence.

The auxiliary access information may be contained in a response to a user equipment finally succeeding in accessing.

In an example, step S12 may include: receiving a random access request from the UE; transmitting a random access response to the UE; receiving uplink data based on the random access response; and transmitting the contention resolution message. A contention resolution message and/or a random access response message containing the auxiliary access information may be generated.

Step S12 may also include: monitoring uplink data transmitted by the user equipment failing to access using the reserved access identification and the granted uplink resources after transmitting the contention resolution message, the uplink data includes a unique identification of the user equipment failing to access. In addition, an RRC connection establishment command is transmitted using the unique identification of the user equipment failing to access. The RRC connection establishment command contains a corrected time advance.

However, as described above, since the TA used for transmitting the uplink data is calculated for a UE previously succeeded in an access rather than for the UE failing to access, the uplink data transmitted by the UE failing to access may not be monitored in step S12. In addition, in a case where the UE failing to access does not receive the RRC connection establishment command after a predetermined period of time, the UE failing to access re-initiates a non-contention-based access using the reserved preamble sequence.

The wireless communication system may include a high-priority level user equipment and a low priority level user equipment. In step S12, in a case where the user equipment issuing the random access request is determined to be the high-priority level user equipment, the auxiliary access information is prepared for the user equipment failing to access.

It can be determined whether a user equipment performing a random access is the high-priority level user equipment based on at least one of: the random access preamble sequence in the random access request; an information bit in the random access request for indicating whether the user equipment is the high-priority level user equipment; and time-frequency resources where the random access preamble sequence is located.

For example, in a case of determining that the random access preamble sequence in the random access request belongs to a specific group, the corresponding user equipment is determined to be the high-priority level user equipment.

In addition, an RA-RNTI of the corresponding user equipment can be calculated based on the time-frequency resources where the random access preamble is located, and it can be determined whether the user equipment is the high-priority level user equipment based on the RA-RNTI.

In order to further accelerate the access of the high-priority level UE, a random access response to the high-priority level user equipment may be preferentially transmitted on receiving random access requests from multiple user equipments including the low-priority level user equipment and the high-priority level user equipment.

In addition, different back-off periods can be set for UEs of different priority levels. For example, a first predetermined back-off period is set for the low-priority level user equipment such that the low-priority level user equipment re-transmits the random access request after backing off for the first predetermined back-off period in a case where the low-priority level user equipment fails to access; and/or a second predetermined back-off period is set for the high-priority level user equipment such that the high-priority level user equipment re-transmits the random access request after backing off for the second predetermined back-off period in a case where the high-priority level user equipment fails to access. The first predetermined back-off period is longer than the second predetermined back-off period.

As an example, the user equipment requests access to a cell operating on an unlicensed frequency band.

The user equipment that requests access to the cell on the unlicensed frequency band may be the high-priority level UE, the random access response and/or the contention resolution message includes at least one of information of the defined transmission time duration on the unlicensed frequency band and information specifying uplink resources for the initial scheduling transmission. The uplink resources for the initial scheduling transmission are resources of a primary cell or resources of a cell on an unlicensed frequency band.

As another example, the high-priority level UE is a V2X user equipment, and the uplink data further includes location information of the user equipment.

A user equipment necessary to receive a security information broadcast can be selected based on the location information of the user equipment in the RRC connection, and the selected user equipment can be informed of a resource position of the security information broadcast through RRC signaling. In addition, the location information of the UE performing the security information broadcast and the resource position of the transmitted security information broadcast can be transmitted by broadcasting the system information.

In this example, the RRC connection establishment command may further include uplink resource scheduling for the security information broadcast.

Figure 12:
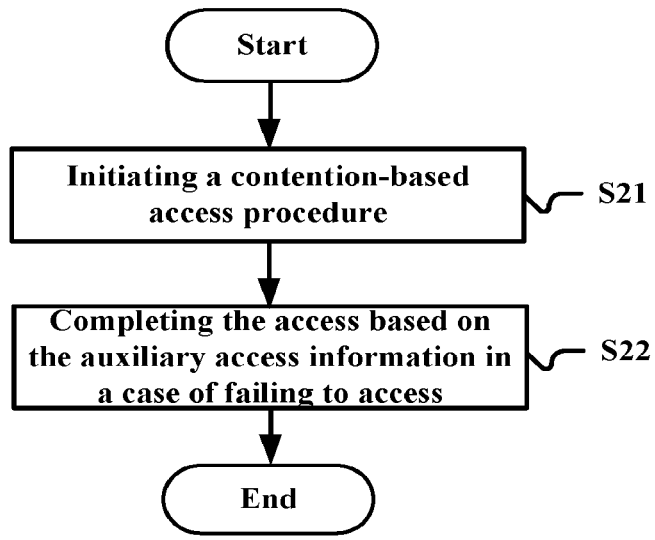
FIG. 12 is a flow chart showing a method on a user equipment side in a wireless communication system according to an embodiment of the present disclosure.

FIG. 12 shows a method on a user equipment side in a wireless communication system according to an embodiment of the present disclosure, which includes: generating, based on predetermined configuration information, a random access request to initiate a contention-based access procedure (S21); and in a case of failing to access, interacting with a base station based on auxiliary access information from the base station, to complete the access procedure (S22).

The auxiliary access information may include at least one of: reserved access identification information; a granted uplink resource indicator for a user equipment failing to access to perform a subsequent uplink transmission; and a reserved random access preamble sequence. The auxiliary access information may be contained in a response to a user equipment finally succeeding in an access. For example, in S22, a contention resolution message and/or a random access response message for the random access request may be parsed to determine the auxiliary access information.

For example, step S22 includes: transmitting the random access request to the base station; receiving a random access response from the base station; transmitting uplink data to the base station based on the random access response; and receiving the contention resolution message. In a case of determining that the user equipment fails to access based on the contention resolution message, step S22 further includes transmitting the uplink data to the base station using the reserved access identity and granted uplink resources. The uplink data includes a unique identification of the user equipment.

In addition, a timer can be caused to start timing when the uplink data is transmitted and to stop timing when a corresponding RRC connection establishment command is received. The RRC connection establishment command includes a corrected time advance. In a case where a timing duration of the timer exceeds a predetermined value and the corresponding RRC connection establishment command is not received, step S22 further includes: transmitting the random access request to the base station using the reserved random access preamble sequence; receiving a random access response including a re-calculated time advance and the granted uplink resource indicator for subsequent uplink transmission from the base station; and transmitting an RRC connection establishment request to the base station using the reserved access identification and the granted uplink resources based on the re-calculated time advance.

In an example, in step S21, it can be determined whether the user equipment is the high-priority level user equipment based on a type of the user equipment and/or a type of an application of the user equipment. Different random access preamble sequences can be determined for user equipments of different priority levels. For example, different root sequence values are allocated to user equipments of different priority levels, or different cyclic shifts are configured for user equipments of different priority levels. Information on a configuration of the cyclic shift may be contained in system information or the high-layer signaling.

In addition, different time-frequency resources for random access requests can be determined for user equipments of different priority levels.

In a case where the random access preamble and time-frequency resources are not distinguished, an information bit indicating whether the user equipment is the high-priority level user equipment may also be included in the random access request.

In order to further accelerate the access of the high-priority level UE, the following configuration may be performed: in a case where the user equipment is a low-priority level user equipment and the user equipment fails in the random access, the random access request is re-transmitted after the user equipment backs off for a first predetermined back-off period set by the base station; and/or in a case where the user equipment is the high-priority level user equipment and the user equipment fails in the random access, the random access request is re-transmitted after the user equipment backs off for a second predetermined back-off period set by the base station, where the first predetermined back-off period is longer than the second predetermined back-off period.

As an example of the high-priority level UE, the user equipment is a V2X user equipment, and step S21 is performed in a case where at least one of the following conditions is satisfied to transmit the random access request: a time duration where the user equipment is in an RRC_IDLE state exceeds a predetermined threshold; the user equipment arrives at a specific area; and it is necessary to broadcast information. In this example, the uplink data may also include location information of the user equipment.

The UE may receive broadcast system information from the base station, where the broadcast system information includes location information of a V2X user equipment performing a broadcast and a resource position of a corresponding security information broadcast. For example, it can be determined whether the security information broadcast is to be received based on the location information of the user equipment and the location information of the V2X user equipment performing the broadcast.

In addition, the UE may receive RRC signaling from the base station. The RRC signaling includes a resource position of the security information broadcast to be received by the user equipment. The UE receives the security information broadcast at the resource position.

In this example, the RRC connection establishment command may also include uplink resource scheduling for the security information broadcast.

It is to be noted that, the above methods can be used separately or in conjunction with each other. The details have been described in detail in the first to third embodiments, and are not repeatedly described here.

In addition, in the above description, a communication system including a base station and a user equipment is also disclosed, where the base station includes the apparatus 100 and the user equipment includes the apparatus 200.

The technology according to the present disclosure can be applied to various types of products. For example, the base station may be implemented as any type of evolved node B (eNB), such as a macro eNB and a small eNB. The small eNB may be an eNB covering a cell smaller than a macro cell, such as a pico eNB, a micro eNB or a home (femto) eNB. Alternatively, the base station may be implemented as any other type of base station, such as a NodeB and a base transceiver station (BTS). The base station may include: a main body (that is also referred to as a base station apparatus) configured to control radio communication, and one or more remote radio heads (RRH) disposed in a different place from the main body. In addition, various types of terminals may each operate as the base station by temporarily or semi-persistently executing a base station function.

For example, the user equipment may be implemented as a mobile terminal (such as a smartphone, a tablet personal computer (PC), a notebook PC, a portable game terminal, a portable/dongle mobile router and a digital camera device) or a vehicle terminal (such as an car navigation apparatus). The user equipment may also be implemented as a terminal performing machine to machine (M2M) communication (also referred to as a machine-type communication (MTC) terminal). In addition, the user equipment may be a wireless communication module installed on each of the above terminals (such as an integrated circuit module including a single chip).

Application Example on a Base Station

First Application Example

Figure 13:
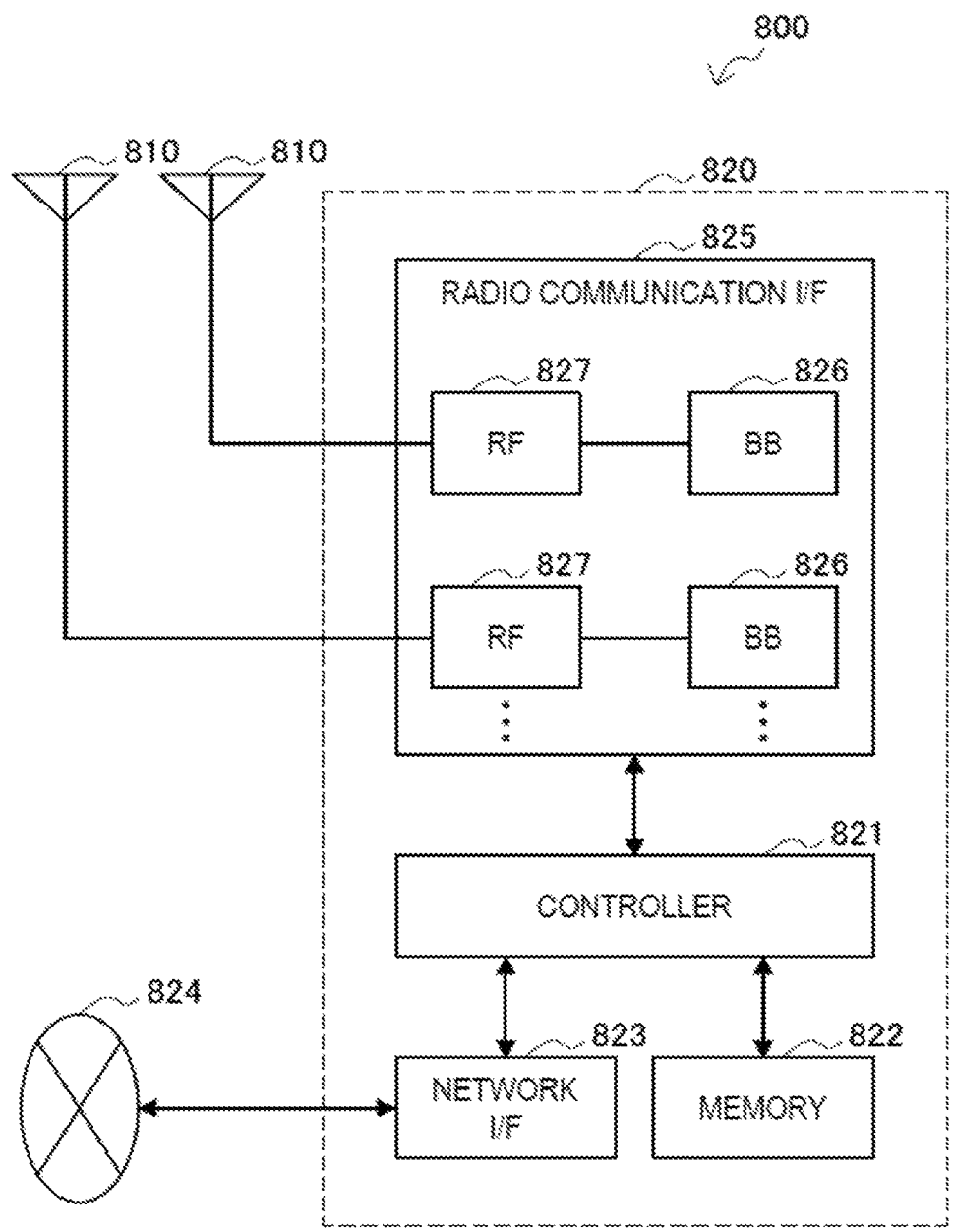
FIG. 13 is a block diagram illustrating a first example of a schematic configuration of an eNB to which the technology of the present disclosure can be applied.

FIG. 13 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive wireless signals. The eNB 800 may include the multiple antennas 810, as illustrated in FIG. 13. For example, the multiple antennas 810 may be compatible with multiple frequency bands used by the eNB 800. Although FIG. 13 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as wireless resource control, wireless bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for wireless backhaul. If the network interface 823 is a radio communication interface, the network interface 823 may use a higher frequency band for wireless communication than a frequency band used by the radio communication interface 825.

The radio communication interface 825 supports any cellular communication scheme such as Long Term Evolution (LTE) and LTE-Advanced, and provides wireless connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), wireless link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

The radio communication interface 825 may include the multiple BB processors 826, as illustrated in FIG. 13. For example, the multiple BB processors 826 may be compatible with multiple frequency bands used by the eNB 800. The radio communication interface 825 may include the multiple RF circuits 827, as illustrated in FIG. 13. For example, the multiple RF circuits 827 may be compatible with multiple antenna elements. Although FIG. 13 illustrates the example in which the radio communication interface 825 includes the multiple BB processors 826 and the multiple RF circuits 827, the radio communication interface 825 may also include a single BB processor 826 or a single RF circuit 827.

Second Application Example

Figure 14:
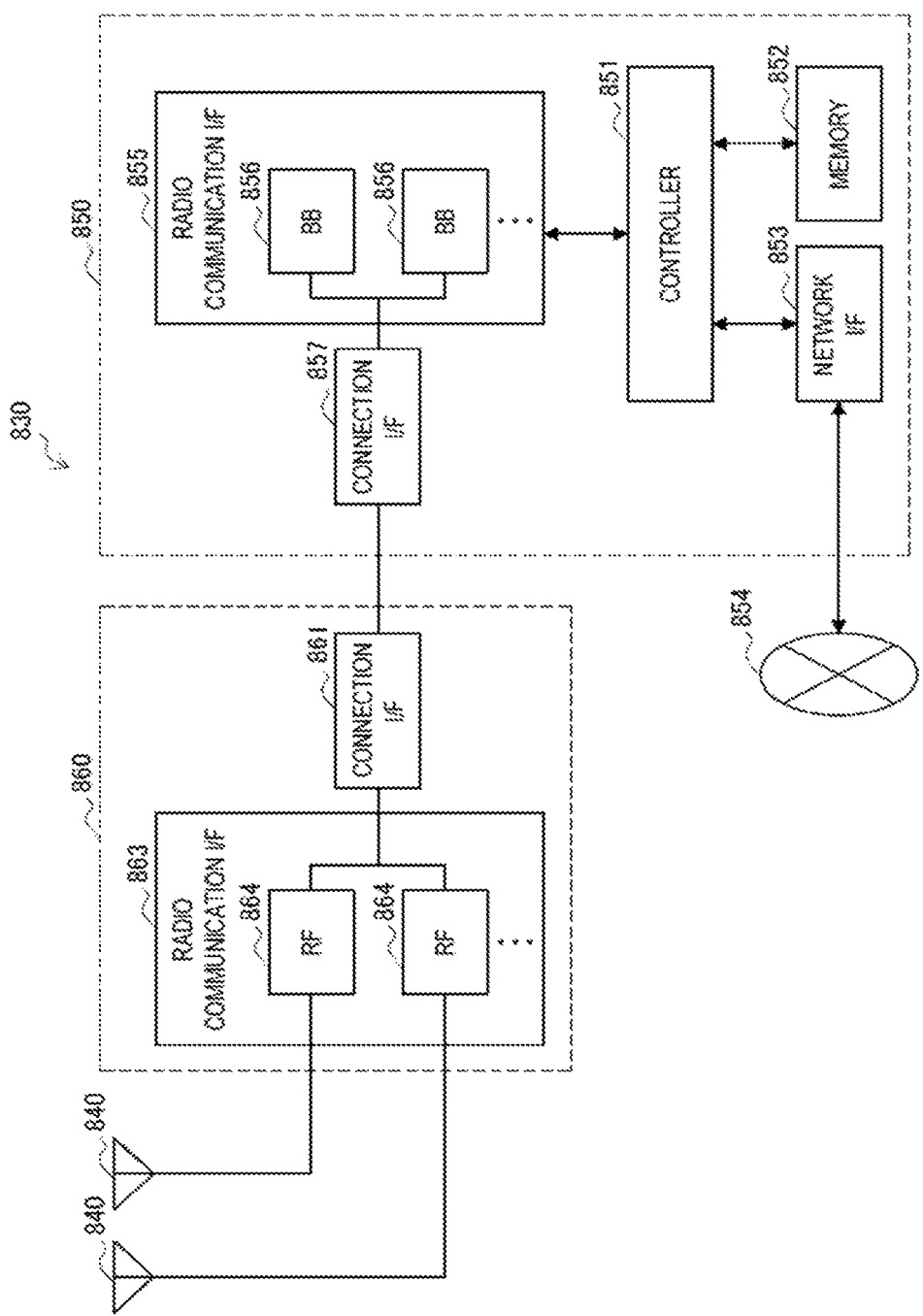
FIG. 14 is block diagram illustrating a second example of a schematic configuration of an eNB to which the technology of the present disclosure can be applied.

FIG. 14 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive wireless signals. The eNB 830 may include the multiple antennas 840, as illustrated in FIG. 14. For example, the multiple antennas 840 may be compatible with multiple frequency bands used by the eNB 830. Although FIG. 14 illustrates the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 13.

The radio communication interface 855 supports any cellular communication scheme such as LTE and LTE-Advanced, and provides wireless communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 13, except the BB processor 856 is connected to the RF circuit 864 of the RRH 860 via the connection interface 857. The radio communication interface 855 may include the multiple BB processors 856, as illustrated in FIG. 14. For example, the multiple BB processors 856 may be compatible with multiple frequency bands used by the eNB 830. Although FIG. 14 illustrates the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter, and an amplifier, and transmits and receives wireless signals via the antenna 840. The radio communication interface 863 may include multiple RF circuits 864, as illustrated in FIG. 14. For example, the multiple RF circuits 864 may support multiple antenna elements. Although FIG. 14 illustrates the example in which the radio communication interface 863 includes the multiple RF circuits 864, the radio communication interface 863 may also include a single RF circuit 864.

In the eNB 800 and eNB 830 shown in FIG. 13 and FIG. 14, the transceiving unit 102 described with reference to FIG. 1 may be implemented by the radio communication interface 825 and the radio communication interface 855 and/or the radio communication interface 863. At least a part of the functions may also be implemented by the controller 821 and the controller 851. For example, the controller 821 and the controller 851 may perform acceleration of the random access procedure by performing the function of the processing unit 101.

Application Example on a User Equipment

First Application Example

Figure 15:
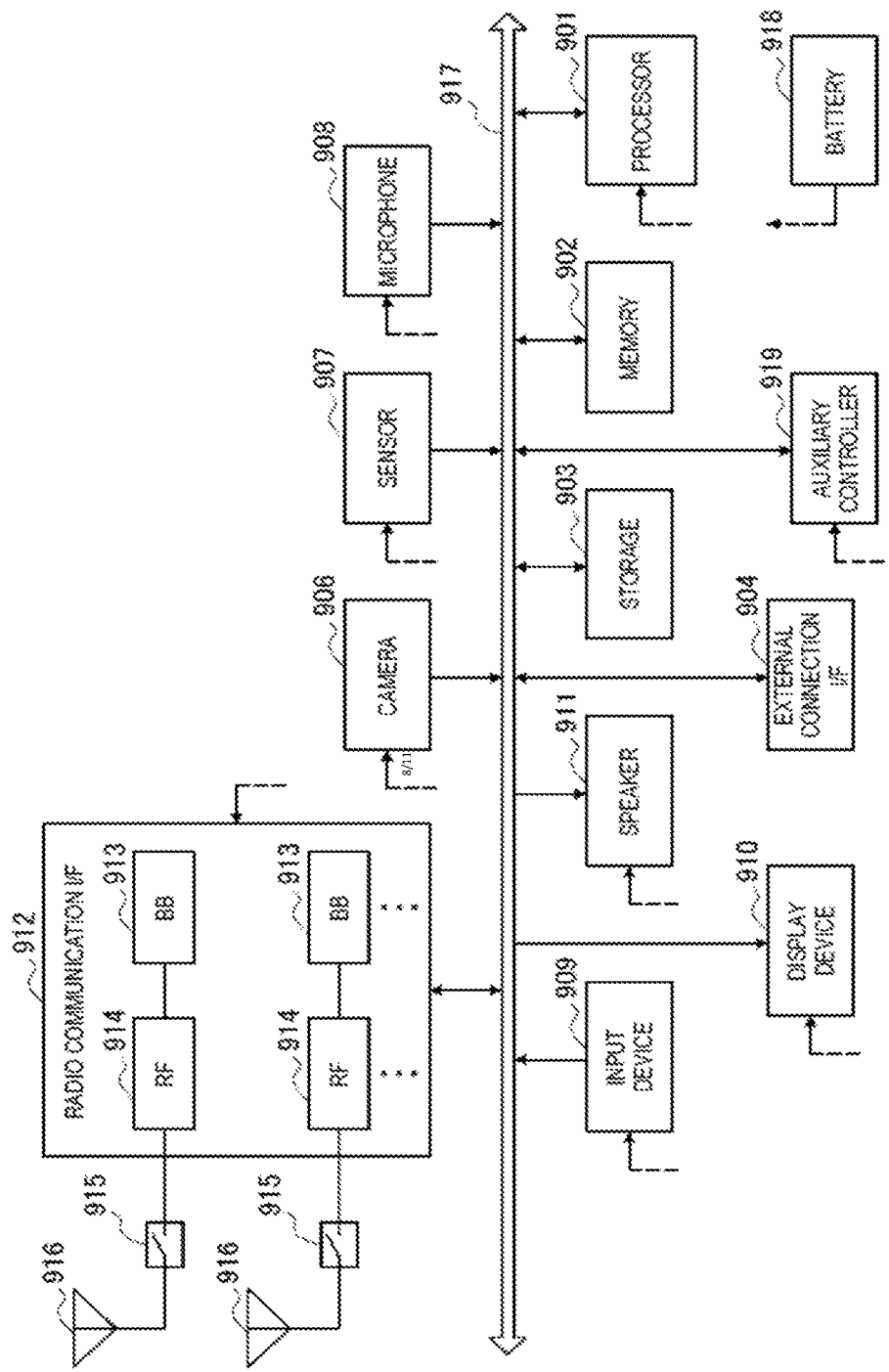
FIG. 15 is a block diagram illustrating an example of a schematic configuration of a smartphone to which the technology of the present disclosure can be applied.

FIG. 15 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LET and LTE-Advanced, and performs wireless communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives wireless signals via the antenna 916. The radio communication interface 912 may be a one chip module having the BB processor 913 and the RF circuit 914 integrated thereon. The radio communication interface 912 may include the multiple BB processors 913 and the multiple RF circuits 914, as illustrated in FIG. 15. Although FIG. 15 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a wireless local area network (LAN) scheme. In that case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna), and is used for the radio communication interface 912 to transmit and receive wireless signals. The smartphone 900 may include the multiple antennas 916, as illustrated in FIG. 15. Although FIG. 15 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 15 via feeder lines, which are partially shown as dashed lines in the figure. The auxiliary controller 919 operates a minimum necessary function of the smartphone 900, for example, in a sleep mode.

In the smartphone 900 illustrated in FIG. 15, the transceiving unit 202 described with reference to FIG. 9 may be implemented by the radio communication interface 912, for example. At least a part of the functions may also be implemented by the processor 901 or the auxiliary controller 919. For example, the processor 901 or the auxiliary controller 919 can implement the random access based on the auxiliary access information by performing functions of the processing unit 201 and the timer 203.

Second Application Example

Figure 16:
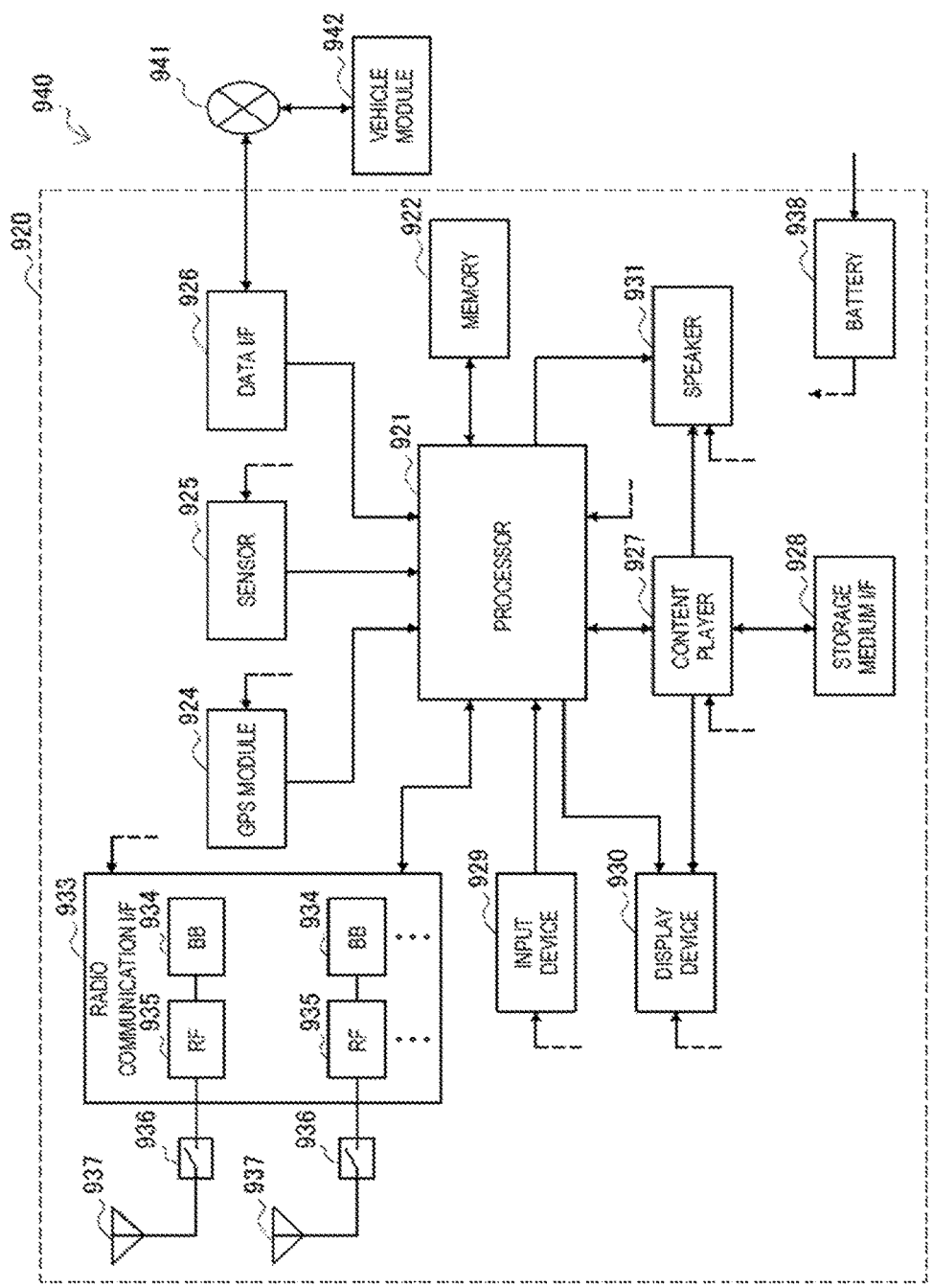
FIG. 16 is a block diagram illustrating an example of a schematic configuration of an car navigation device to which the technology of the present disclosure can be applied.

FIG. 16 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LTE and LTE-Advanced, and performs wireless communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives wireless signals via the antenna 937. The radio communication interface 933 may also be a one chip module that has the BB processor 934 and the RF circuit 935 integrated thereon. The radio communication interface 933 may include the multiple BB processors 934 and the multiple RF circuits 935, as illustrated in FIG. 16. Although FIG. 16 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In that case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used for the radio communication interface 933 to transmit and receive wireless signals. The car navigation apparatus 920 may include the multiple antennas 937, as illustrated in FIG. 16. Although FIG. 16 illustrates the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In that case, the antenna switches 936 may be omitted from the configuration of the car navigation apparatus 920.

The battery 938 supplies power to blocks of the car navigation apparatus 920 illustrated in FIG. 16 via feeder lines that are partially shown as dashed lines in the figure. The battery 938 accumulates power supplied form the vehicle.

In the car navigation apparatus 920 illustrated in FIG. 16, the transceiving unit 202 described with reference to FIG. 9 may be implemented by the radio communication interface 933. At least a part of the functions may also be implemented by the processor 921. For example, the processor 921 can implement random access based on the auxiliary access information by performing functions of the processing unit 201 and the timer 203.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

The basic principle of the present disclosure has been described above in conjunction with particular embodiments. However, as can be appreciated by those ordinarily skilled in the art, all or any of the steps or components of the method and device according to the disclosure can be implemented in hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

It can be understood by those skilled in the art that, for example, the adjacent access point information acquisition unit, the determination unit, the auxiliary configuration unit, the operation parameter configuration unit in the device described above may be implemented by one or more processors. The notification unit and the like may be implemented by circuit elements such as an antenna, a filter, a modem, and a coder.

Therefore, an electronic device (1) is disclosed according to the present disclosure, which includes circuitry configured to: determine, in response to a random access request from a user equipment, whether an access procedure initiated by the user equipment is a contention-based access procedure or a non-contention-based access procedure; and prepare, for the contention-based access procedure, auxiliary access information for a user equipment potentially failing to access, to enable the user equipment failing to access to interact with the base station based on the auxiliary access information to complete the access procedure.

An electronic device (2) is also disclosed according to the present disclosure, which includes circuitry configured to: generate, based on predetermined configuration information, a random access request to initiate a contention-based access procedure; and in a case of failing to access, interact with a base station based on auxiliary access information from the base station, to complete the access procedure.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized by software or firmware, a program constituting the software is installed in a computer with a dedicated hardware structure (e.g. the general computer 1700 shown in FIG. 17) from a storage medium or network, where the computer is capable of implementing various functions when installed with various programs.

Figure 17:
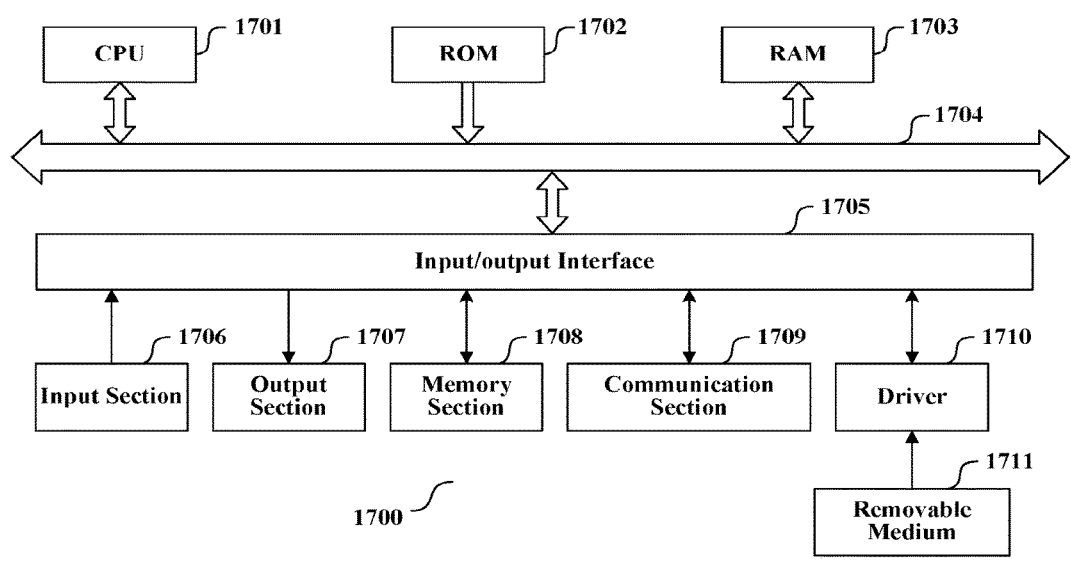
FIG. 17 is an exemplary block diagram illustrating the structure of a general purpose personal computer capable of realizing the method and/or device and/or system according to the embodiments of the present invention.

In FIG. 17, a central processing unit (CPU) 1701 executes various processing based on a program stored in a read-only memory (ROM) 1702 or a program loaded to a random access memory (RAM) 1703 from a memory section 1708. The data needed for the various processing of the CPU 1701 may be stored in the RANI 1703 as needed. The CPU 1701, the ROM 1702 and the RAM 1703 are linked with each other via a bus 1704. An input/output interface 1705 is also linked to the bus 1704.

The following components are linked to the input/output interface 1705: an input section 1706 (including keyboard, mouse and the like), an output section 1707 (including displays such as a cathode ray tube (CRT), a liquid crystal display (LCD), a loudspeaker and the like), a memory section 1708 (including hard disc and the like), and a communication section 1709 (including a network interface card such as a LAN card, modem and the like). The communication section 1709 performs communication processing via a network such as the Internet. A driver 1710 may also be linked to the input/output interface 1705. If needed, a removable medium 1711, for example, a magnetic disc, an optical disc, a magnetic optical disc, a semiconductor memory and the like, may be installed in the driver 1710, so that the computer program read therefrom is installed in the memory section 1708 as appropriate.

In the case where the foregoing series of processing is achieved by software, programs forming the software are installed from a network such as the Internet or a memory medium such as the removable medium 1711.

It should be appreciated by those skilled in the art that the memory medium is not limited to the removable medium 1711 shown in FIG. 17, which has program stored therein and is distributed separately from the apparatus so as to provide the programs to users. The removable medium 1711 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1702 and the memory section 1708 in which programs are stored, and can be distributed to users along with the device in which they are incorporated.

To be further noted, in the device, method and system according to the present, the respective components or steps can be decomposed and/or recombined. These decompositions and/or recombinations shall be regarded as equivalent schemes of the present disclosure. Moreover, the above series of processing steps can naturally be performed temporally in the sequence as described above but is not limited thereto, and some of the steps can be performed in parallel or independently from each other.

Finally, it is to be further noted that, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s) unless further defined.

Although the embodiments of the present disclosure have been described above in detail in connection with the drawings, it shall be appreciated that the embodiments as described above are merely illustrative but not limitative of the disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An apparatus on a base station side in a wireless communication system, comprising:
a processing unit configured to
receive a failed random access request from a user equipment, which was sent while the user equipment was in an RRC_IDLE state, wherein the failed random access request included a preamble sequence and a PRACH time-frequency resource indication which were both already received from a first successful random access request sent by another user equipment;
determine, in response to the failed random access request from the user equipment, whether the failed random access request was part of a contention-based access procedure; and
after determining the failed random access request was part of the contention-based access procedure, prepare auxiliary access information for the user equipment which was determined to have sent the second random access request which is part of the contention-based access procedure and which was determined to have included the preamble sequence and the PRACH time-frequency resource indication which were both already received from the first random access request;
wherein the auxiliary information is set so that the user equipment can use the auxiliary information in a subsequent non-contention based access request, and the auxiliary information includes a unique identification of the user equipment which sent the failed random access request for use in the subsequent non-contention based access request.

2. The apparatus according to claim 1, wherein the auxiliary access information comprises at least one of:
reserved access identification information;
a granted uplink resource indicator for the user equipment failing to access to perform a subsequent uplink transmission; and
a reserved random access preamble sequence.

3. The apparatus according to claim 1, wherein the auxiliary access information is contained in a response to a user equipment finally succeeding in accessing,
wherein the processing unit is configured to generate a contention resolution message and/or a random access response message containing the auxiliary access information.

4. The apparatus according to claim 1, wherein the wireless communication system comprises a high-priority level user equipment and a low-priority level user equipment, and the processing unit is configured to prepare the auxiliary access information for the user equipment failing to access in a case where the user equipment issuing the random access request is determined to be the high-priority level user equipment.

5. The apparatus according to claim 4, wherein the apparatus operates as the base station, and further comprises:
a transceiving unit, configured to receive the random access request from the user equipment, transmit a random access response to the user equipment, receive uplink data based on the random access response, and transmit the contention resolution message, wherein
the processing unit is further configured to determine whether the user equipment performing a random access is the high-priority level user equipment based on at least one of: the random access preamble sequence in the random access request, an information bit in the random access request for indicating whether the user equipment is the high-priority level user equipment, and time frequency resources where the random access preamble sequence is located.

6. The apparatus according to claim 5, wherein, in a case where the processing unit determines that the random access preamble sequence in the random access request belongs to a specific group, the processing unit determines that the corresponding user equipment is the high-priority level user equipment,
wherein the processing unit is configured to calculate, based on the time frequency resources where the random access preamble sequence is located, RA-RNTI of the corresponding user equipment, and determine whether the user equipment is the high-priority level user equipment based on the RA-RNTI.

7. The apparatus according to claim 5, wherein
the transceiving unit is further configured to preferentially transmit the random access response to the high-priority level user equipment on receiving random access requests from multiple user equipments comprising the high-priority level user equipment and the low-priority level user equipment.

8. The apparatus according to claim 4, wherein the processing unit is further configured to:
set a first predetermined back-off period for the low-priority level user equipment, to cause the low-priority level user equipment to re-transmit the random access request after backing off for the first predetermined back-off period in a case of failing to access; and/or
set a second predetermined back-off period for the high-priority level user equipment, to cause the high-priority level user equipment to re-transmit the random access request after backing off for the second predetermined back-off period in a case of failing to access, wherein the first predetermined back-off period is longer than the second predetermined back-off period.

9. The apparatus according to claim 1, wherein the user equipment requests to access to a cell operating on an unlicensed frequency band.

10. The apparatus according to claim 5, wherein the high-priority level user equipment is a user equipment requesting to access to a cell operating on an unlicensed frequency band, the random access response and/or the contention resolution message comprises at least one of information regarding a defined transmission time duration on the unlicensed frequency band and information specifying uplink resources for initial scheduling transmission, wherein the uplink resources for the initial scheduling transmission are resources of a primary cell or resourced of the cell operating on the unlicensed frequency band.

11. The apparatus according to claim 5, wherein the transceiving unit is further configured to:
monitor, after transmitting the contention resolution message, uplink data transmitted by the user equipment failing to access using the reserved access identification and the granted uplink resources, the uplink data comprising a unique identification of the user equipment failing to access.

12. The apparatus according to claim 11, wherein the user equipment is a V2X user equipment, and the uplink data further comprises location information of the user equipment.

13. The apparatus according to claim 12, wherein the processing unit is further configured to select, based on location information of a user equipment in RRC connection, a user equipment that needs to receive security information broadcast, and the transceiving unit notifies the selected user equipment of a resource position of the security information broadcast through RRC signaling.

14. The apparatus according to claim 9, wherein
the transceiving unit is further configured to transmit an RRC connection establishment command using the unique identification of the user equipment failing to access, wherein the RRC connection establishment command contains a corrected time advance, and
wherein the user equipment is a V2X user equipment, and the RRC connection
establishment command further comprises uplink resources scheduling for the security information broadcast.

15. An apparatus on a user equipment side in a wireless communication system, comprising:
a processing unit configured to
generate a random access request to initiate a contention-based access procedure, wherein the random access request was sent when the apparatus was in an RRC_IDLE state and the random access request included a preamble sequence and a PRACH time-frequency resource indication which were both already received by a base station from a first successful random access request sent by another user equipment;
after failing to gain access to the base station resources, monitor for auxiliary access information from the base station;
receive the auxiliary access information from the base station; and
use the auxiliary information to send a subsequent non-contention based access request, wherein the auxiliary information includes a unique identification of the user equipment which sent the failed random access request for use in the subsequent non-contention based access request.

16. The apparatus according to claim 15, wherein the auxiliary access information comprises at least one of:
reserved access identification information;
a granted uplink resource indicator for the user equipment failing to access to perform a subsequent uplink transmission; and
a reserved random access preamble sequence.

17. The apparatus according to claim 15, wherein the processing unit is further configured to determine different random access preamble sequences for user equipments of different priority levels: and/or determine, for user equipments of different priority levels, different time frequency resources for random access requests.

18. The apparatus according to claim 15, further comprising:
a transceiving unit, configured to transmit the random access request to the base station; receive a random access response from the base station; transmit uplink data to the base station based on the random access response; and receive a contention resolution message.

19. The apparatus according to claim 18, wherein the user equipment is a V2X user equipment serving as high-priority level user equipment, and the transceiving unit transmits the random access request in a case where at least one of the following conditions is satisfied: a time duration in which the user equipment is in an RRC_IDLE state exceeds a predetermined threshold; the user equipment arrives at a specific area; and it is necessary to broadcast information.

20. A method on a user equipment side in a wireless communication system, comprising:
generating a random access request to initiate a contention-based access procedure, wherein the random access request was sent when the apparatus was in an RRC_IDLE state and the random access request included a preamble sequence and a PRACH time-frequency resource indication which were both already received by a base station from a first successful random access request sent by another user equipment;
after failing to access to the base station resources, monitor for auxiliary access information from the base station;
receive the auxiliary access information from the base station; and
use the auxiliary information to send a subsequent non-contention based access request, wherein the auxiliary information includes a unique identification of the user equipment which sent the failed random access request for use in the subsequent non-contention based access request.

* * * * *